United States Patent
Koorapaty et al.

(10) Patent No.: US 11,147,097 B2
(45) Date of Patent: Oct. 12, 2021

(54) RESOURCE ALLOCATION AND SIGNALING METHODS FOR SCHEDULING IN UNLICENSED SPECTRUM

(71) Applicant: TELEFONAKTIEBOLAGET L M ERICSSON (PUBL), Stockholm (SE)

(72) Inventors: Havish Koorapaty, Saratoga, CA (US); Cagatay Capar, Cukurova (TR); Jung-Fu Cheng, Fremont, CA (US); Amitav Mukherjee, Fremont, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 126 days.

(21) Appl. No.: 16/099,612

(22) PCT Filed: May 19, 2017

(86) PCT No.: PCT/IB2017/052972
§ 371 (c)(1),
(2) Date: Nov. 7, 2018

(87) PCT Pub. No.: WO2017/199219
PCT Pub. Date: Nov. 23, 2017

(65) Prior Publication Data
US 2019/0150182 A1 May 16, 2019

Related U.S. Application Data

(60) Provisional application No. 62/339,722, filed on May 20, 2016.

(51) Int. Cl.
*H04W 72/14* (2009.01)
*H04W 16/14* (2009.01)
(Continued)

(52) U.S. Cl.
CPC .......... *H04W 72/14* (2013.01); *H04L 5/0041* (2013.01); *H04L 5/0094* (2013.01); *H04W 16/14* (2013.01);
(Continued)

(58) Field of Classification Search
CPC ..... H04L 5/001; H04L 5/0023; H04L 5/0041; H04L 5/0094; H04W 16/14;
(Continued)

(56) References Cited

U.S. PATENT DOCUMENTS

2016/0095120 A1\* 3/2016 Gaal ............... H04W 16/14
370/329
2016/0100407 A1 4/2016 Gaal et al.
(Continued)

OTHER PUBLICATIONS

Huawei et al., "Resource allocation for RB interleaved PUSCH for eLAA", 3GPP TSG RAN WG1 Meeting #85, R1-164055, May 23-27, 2016.
(Continued)

*Primary Examiner* — Omar J Ghowrwal
*Assistant Examiner* — Kokou R Detse
(74) *Attorney, Agent, or Firm* — Withrow & Terranova, PLLC

(57) ABSTRACT

Systems and methods are disclosed that relate to management of uplink (UL) transmissions in unlicensed spectrum. In some embodiments, a method of operation of a network node in a wireless communication network comprises signaling, to a wireless device, an indication of one or more allocated sets of Resource Blocks (RBs) that are allocated to the wireless device by a UL grant for transmission on a UL carrier in an unlicensed frequency spectrum. The one or more allocated sets of RBs are one or more of a plurality of defined sets of RBs that correspond to a plurality of interlaces, respectively, that each spread out across an entire bandwidth of the UL carrier. In this manner, higher UL user and system performance can be obtained.

28 Claims, 12 Drawing Sheets

(51) Int. Cl.
 *H04L 5/00* (2006.01)
 *H04W 72/04* (2009.01)
 *H04W 74/08* (2009.01)

(52) U.S. Cl.
 CPC ... *H04W 72/0453* (2013.01); *H04W 74/0808* (2013.01); *H04L 5/001* (2013.01); *H04L 5/0023* (2013.01)

(58) Field of Classification Search
 CPC ......... H04W 72/0413; H04W 72/0453; H04W 72/14; H04W 74/0808
 USPC .......................................................... 370/329
 See application file for complete search history.

(56) References Cited

U.S. PATENT DOCUMENTS

2018/0049165 A1\* 2/2018 Byun ................ H04W 72/0446
2018/0343670 A1\* 11/2018 Park ................. H04W 72/1289

OTHER PUBLICATIONS

Nec, "Remaining issues on PUSCH resource allocation", 3GPP TSG RAN WG1 Meeting #85, R1-164479, May 23-27, 2016.
Ericsson, "Uplink Resource Allocation Design for Enhanced LAA", 3GPP TSG RAN WG1 Meeting #84bis, R1-163138, Apr. 11-15, 2016.
Sequans Communications, "RB Allocation for PUSCH", 3GPP TSG RAN WG1 Meeting #84bis, R1-162756, Apr. 11-15, 2016.
3GPP TS 36.211, V11.4.0, 3rd Generation Partnership Project; Technical Specification Group Radio Access Network Evolved Universal Terrestrial Radio Access (E-UTRA); Physical Channels and Modulation, Release 11, Sep. 2013.
3GPP TS 36.213, V11.4.0, 3rd Generation Partnership Project; Technical Specification Group Radio Access Network Evolved Universal Terrestrial Radio Access (E-UTRA); Physical layer procedures, Release 11, Sep. 2013.
3GPP TS 36.331, V11.5.0, 3rd Generation Partnership Project; Technical Specification Group Radio Access Network Evolved Universal Terrestrial Radio Access (E-UTRA); Radio Resource Control (RRC), Release 11, Sep. 2013.

\* cited by examiner

RESOURCE ALLOCATION AND SIGNALING METHODS FOR SCHEDULING IN UNLICENSED SPECTRUM

RELATED APPLICATIONS

This application is a national stage application of International Patent Application No. PCT/IB2017/052972, filed May 19, 2017, which claims the benefit of provisional patent application Ser. No. 62/339,722, filed May 20, 2016, the disclosures of which are hereby incorporated herein by reference in their entireties.

TECHNICAL FIELD

The present disclosure relates, in general, to wireless communications and, more particularly, to resource allocation and signaling methods for scheduling in unlicensed spectrum.

BACKGROUND

The Third Generation Partnership Project (3GPP) Release (Rel) 13 specification for "License Assisted Access" (LAA) allows Long Term Evolution (LTE) equipment to also operate in unlicensed 5 gigahertz (GHz) radio spectrum. The unlicensed 5 GHz spectrum is used as a complement to the licensed spectrum. Accordingly, User Equipment devices (UEs) connect in the licensed spectrum to a Primary Cell (PCell) and use Carrier Aggregation (CA) to benefit from additional transmission capacity in the unlicensed spectrum by also connecting to a Secondary Cell (SCell). To reduce the changes required for aggregating licensed and unlicensed spectrum, the LTE frame timing in the PCell is simultaneously used in the SCell.

The ongoing standalone LTE-Unlicensed (LTE-U) forum and 3GPP Rel-14 work item on uplink (UL) LAA intends to allow LTE UEs to transmit on the UL in the unlicensed 5 GHz or license-shared 3.5 GHz radio spectrum. For the case of standalone LTE-U, all downlink (DL) and UL transmissions take place entirely on the unlicensed spectrum.

Regulatory requirements may not permit transmissions in the unlicensed spectrum without prior channel sensing. Since the unlicensed spectrum must be shared with other radios of similar or dissimilar wireless technologies, a so-called Listen-Before-Talk (LBT) method needs to be applied. This LBT method involves sensing the medium for a predefined minimum amount of time and backing off if the channel is busy.

Wi-Fi™, LAA, and standalone LTE-U may operate in multi-carrier mode with simultaneous transmission across multiple unlicensed channels in the 5 GHz band. Wi-Fi™ follows a hierarchical multi-carrier LBT scheme across multiple carriers which are selected using specific channel bonding rules.

For LAA and standalone LTE-U, UL transmissions are explicitly scheduled by the enhanced or evolved Node B (eNB), which has full control over when UEs are allowed to transmit. However, for carriers operating in unlicensed spectrum, UEs must perform some form of LBT before transmitting on the carrier. The form of LBT may depend on the number of UEs that are scheduled, the number of subframes that are scheduled in succession, the length of the previous transmissions on the carrier, and other such factors. It is known that some parameters related to LBT can be signaled by the eNB to UEs so that they may perform LBT before transmission. However, the known signaling parameters do not fully encompass all the use cases and problems that will be encountered for UL transmissions in unlicensed spectrum. Thus, signaling methods to solve these problems and address the new use cases are needed. In addition, there is also a need to increase efficiency of LTE in unlicensed spectrum.

A more detailed background of existing technology is given below before describing the various embodiments in subsequent sections.

1 LTE

FIG. 1 illustrates an example LTE DL physical resource. LTE uses Orthogonal Frequency Division Multiplexing (OFDM) in the DL and Discrete Fourier Transform (DFT)-spread OFDM (also referred to as single-carrier Frequency Division Multiple Access (FDMA)) in the UL. More particularly, FIG. 1 illustrates the basic LTE DL physical resource as a time-frequency grid, where each resource element corresponds to one OFDM subcarrier during one OFDM symbol interval. The UL subframe has the same subcarrier spacing as the DL and the same number of Single Carrier Frequency Division Multiple Access (SC-FDMA) symbols in the time domain as OFDM symbols in the DL.

FIG. 2 illustrates an example LTE time-domain structure. As shown in FIG. 2, in the time domain, LTE DL transmissions are organized into radio frames of 10 milliseconds (ms), each radio frame consisting of ten equally-sized subframes of length $T_{subframe}=1$ ms. For normal cyclic prefix, one subframe consists of 14 OFDM symbols. The duration of each symbol is approximately 71.4 microseconds (μs).

Furthermore, the resource allocation in LTE is typically described in terms of Resource Blocks (RBs), where a RB corresponds to one slot (0.5 ms) in the time domain and 12 contiguous subcarriers in the frequency domain. A pair of two adjacent RBs in time direction (1.0 ms) is known as a RB pair. RBs are numbered in the frequency domain, starting with 0 from one end of the system bandwidth.

DL transmissions are dynamically scheduled. In other words, in each subframe the eNB transmits control information about which UEs data is transmitted to and upon which RBs the data is transmitted, in the current DL subframe. This control signaling is typically transmitted in the first 1, 2, 3, or 4 OFDM symbols in each subframe and the number n=1, 2, 3, or 4 is known as the Control Format Indicator (CFI). The DL subframe also contains common reference symbols, which are known to the receiver and used for coherent demodulation of, for example, the control information.

FIG. 3 illustrates an example DL subframe. More particularly, FIG. 3 illustrates a DL system with CFI=3 OFDM symbols as control. From LTE Rel-11 onwards, the above described resource assignments can also be scheduled on the enhanced Physical Downlink Control Channel (EPDCCH). For Rel-8 to Rel-10 only Physical Downlink Control Channel (PDCCH) is available.

The reference symbols shown in FIG. 3 are the Cell specific Reference Symbols and are used to support multiple functions including fine time and frequency synchronization and channel estimation for certain transmission modes.

1.1 PDCCH and EPDCCH

The PDCCH/EPDCCH is used to carry DL Control Information (DCI) such as scheduling decisions and power control commands. More specifically, the DCI includes:

DL scheduling assignments, including Physical Downlink Shared Channel (PDSCH) resource indication, transport format, Hybrid Automatic Repeat Request (HARQ) information, and control information related to spatial multiplexing (if applicable). A DL scheduling assignment also includes a command for power control of the Physical Uplink Control Channel (PUCCH) used for transmission of HARQ Acknowledgements (ACKs) in response to DL scheduling assignments.

UL scheduling grants, including Physical Uplink Shared Channel (PUSCH) resource indication, transport format, and HARQ related information. A UL scheduling grant also includes a command for power control of the PUSCH.

Power control commands for a set of terminals as a complement to the commands included in the scheduling assignments/grants.

One PDCCH/EPDCCH carries one DCI message containing one of the groups of information listed above. As multiple terminals can be scheduled simultaneously, and each terminal can be scheduled on both DL and UL simultaneously, there must be a possibility to transmit multiple scheduling messages within each subframe. Each scheduling message is transmitted on separate PDCCH/EPDCCH resources, and consequently there are typically multiple simultaneous PDCCH/EPDCCH transmissions within each subframe in each cell. Furthermore, to support different radio channel conditions, link adaptation can be used, where the code rate of the PDCCH/EPDCCH is selected by adapting the resource usage for the PDCCH/EPDCCH to match the radio channel conditions.

1.2 CA

The LTE standard supports bandwidths larger than 20 megahertz (MHz) since Rel-10. One important requirement on LTE Rel-10 was to assure backward compatibility with LTE Rel-8. This should also include spectrum compatibility. That would imply that an LTE Rel-10 carrier, wider than 20 MHz, should appear as a number of LTE carriers to an LTE Rel-8 terminal. Each such carrier can be referred to as a Component Carrier (CC). In particular for early LTE Rel-10 deployments, it was expected that there would be a smaller number of LTE Rel-10-capable UEs compared to many LTE legacy UEs. Therefore, it was necessary to assure an efficient use of a wide carrier also for legacy terminals, i.e. that it is possible to implement carriers where legacy UEs can be scheduled in all parts of the wideband LTE Rel-10 carrier. The straightforward way to obtain this would be by means of CA. CA implies that an LTE Rel-10 or later terminal can receive multiple CCs, where the CCs have, or at least the possibility to have, the same structure as a Rel-8 carrier.

FIG. 4 illustrates an example CA. A CA-capable UE is assigned a PCell which is always activated, and one or more SCells which may be activated or deactivated dynamically.

The number of aggregated CCs as well as the bandwidth of the individual CCs may be different for UL and DL. A symmetric configuration refers to the case where the number of CCs in DL and UL is the same whereas an asymmetric configuration refers to the case that the number of CCs is different. It is important to note that the number of CCs configured in a cell may be different from the number of CCs seen by a UE. A UE may for example support more DL CCs than UL CCs, even though the cell is configured with the same number of UL and DL CCs.

CA as described briefly above is used for LAA where the primary carrier or PCell operates in licensed spectrum and one or more secondary carriers or SCells operate in unlicensed spectrum.

1.3 Cross Carrier Scheduling

A key feature of CA is the ability to perform cross-carrier scheduling. With cross-carrier scheduling, the PDSCH is received on a CC other than the one on which PDCCH/EPDCCH is received. Similarly, the PUSCH would be transmitted on an associated CC other than the one on which the UL grant is received. This mechanism allows a (E)PDCCH on one CC to schedule data transmissions on another CC by means of a 3-bit Carrier Indicator Field (CIF) inserted at the beginning of the (E)PDCCH messages. For data transmissions on a given CC, a UE expects to receive scheduling messages on the (E)PDCCH on just one CC—either the same CC, or a different CC via cross-carrier scheduling; this mapping from (E)PDCCH to PDSCH is also configured semi-statically.

2 Wireless Local Area Network (WLAN)

In typical deployments of a WLAN, Carrier Sense Multiple Access with Collision Avoidance (CSMA/CA) is used for medium access. This means that the channel is sensed to perform a Clear Channel Assessment (CCA), and a transmission is initiated only if the channel is declared as Idle. In case the channel is declared as Busy, the transmission is essentially deferred until the channel is deemed to be Idle. When the range of several Access Points (APs) using the same frequency overlap, this means that all transmissions related to one AP might be deferred in case a transmission on the same frequency to or from another AP which is within range can be detected. Effectively, this means that if several APs are within range, they will have to share the channel in time, and the throughput for the individual APs may be severely degraded.

FIG. 5 illustrates an example of LBT in Wi-Fi™. More particularly, FIG. 5 is a general illustration of the LBT mechanism on a single unlicensed channel.

First, consider the single-channel LBT case. After a Wi-Fi™ station A transmits a data frame to a station B, station B shall transmit the ACK frame back to station A with a delay of 16 ps. Such an ACK frame is transmitted by station B without performing a LBT operation. To prevent another station interfering with such an ACK frame transmission, a station shall defer for a duration of 34 ps (referred to as Distributed Inter-Frame Space (DIFS)) after the channel is observed to be occupied before assessing again whether the channel is occupied.

Therefore, a station that wishes to transmit first performs a CCA by sensing the medium for a fixed duration Distributed Coordination Function (DCF) Inter-Frame Spacing (DIFS). If the medium is idle, then the station assumes that it may take ownership of the medium and begin a frame exchange sequence. If the medium is busy, the station waits for the medium to go idle, defers for DIFS, and waits for a further random backoff period.

To further prevent a station from occupying the channel continuously and thereby prevent other stations from accessing the channel, it is required for a station wishing to transmit again after a transmission is completed to perform a random backoff.

For multi-carrier operation, Wi-Fi™ follows a hierarchical channel bonding scheme to determine its transmission bandwidth for a frame, which could be 20 MHz, 40 MHz, 80 MHz, or 160 MHz for example. In the 5 GHz band, wider Wi-Fi™ channel widths of 40 MHz, 80 MHz, 160 MHz, or 80+80 MHz are formed by combining 20 MHz sub-channels in a non-overlapping manner. A predetermined primary channel performs the Contention Window (CW)-based random access procedure after a defer period if necessary, and then counts down the random number generated. The secondary channels only perform a quick CCA check for a Point Coordination Function (PCF) Inter-Frame Spacing (PIFS) duration (generally 25 ps) before the potential start of transmission to determine if the additional secondary channels are available for transmission. Based on the results of the secondary CCA check, transmission is performed on the larger bandwidths; otherwise, transmission falls back to smaller bandwidths. The Wi-Fi™ primary channel is always included in all transmissions, i.e. transmission on secondary channels alone is not allowed.

3 Operation of LTE in Unlicensed Spectrum

Up to now, the spectrum used by LTE is dedicated to LTE. This has the advantage that an LTE system does not need to care about coexistence with other non-3GPP radio access technologies in the same spectrum and spectrum efficiency can be maximized. However, the spectrum allocated to LTE is limited, which cannot meet the ever increasing demand for larger throughput from applications/services. Therefore, 3GPP Rel-13 extends LTE to exploit unlicensed spectrum in addition to licensed spectrum. In addition, standalone LTE-U is under development by the MuLTEfire™ Alliance, where LTE operates solely in unlicensed spectrum.

FIG. 6 illustrates an example of a CA-capable UE configured with one LAA SCell. With LAA to unlicensed spectrum, as shown in FIG. 6, a UE is connected to a PCell in the licensed band and one or more SCells in the unlicensed band. A SCell in unlicensed spectrum is denoted herein as an LAA SCell. The LAA SCell may operate in DL-only mode or operate with both UL and DL traffic. Furthermore, the LTE nodes may operate in standalone mode in license-exempt channels without assistance from a licensed cell. Unlicensed spectrum can, by definition, be simultaneously used by multiple different technologies. Therefore, LAA and standalone LTE-U as described above need to consider coexistence with other systems such as IEEE 802.11 (Wi-Fi™).

To coexist in a fair manner with a Wi-Fi™ system, transmission on the SCell shall conform to LBT protocols in order to avoid collisions and causing severe interference to ongoing transmissions. This includes both performing LBT before commencing transmissions and limiting the maximum duration of a single transmission burst. The maximum transmission burst duration is specified by country and region specific regulations, for example, 4 ms in Japan and 13 ms according to EN 301.893.

FIG. 7 illustrates an example of LAA to unlicensed spectrum using LTE CA and LBT to ensure good coexistence with other unlicensed band technologies. More particularly, FIG. 7 illustrates an example in the context of LAA with different examples for the duration of a transmission burst on the LAA SCell constrained by a maximum allowed transmission duration of 4 ms. Before the eNB transmits data in the DL, it performs LBT to gain channel access. During the eNB's transmission duration, it also sends out control channels to schedule certain UEs to transmit in the UL at specific time later. After the eNB releases the channel, the scheduled UEs perform LBT to determine whether they can transmit in the channel at said specific time.

4 Multi-Carrier Operation

The use of LTE CA, introduced since Rel-10, offers means to increase the peak data rate, system capacity, and user experience by aggregating radio resources from multiple carriers that may reside in the same band or a different band. Rel-13 LAA and standalone LTE-U offer the ability to operate on multiple carriers in unlicensed spectrum simultaneously. The extension of the CA framework beyond five carriers was completed in LTE Rel-13 which supports up to 32 carriers in both UL and DL.

5 Multi-Subframe Scheduling

Discussions are currently ongoing in 3GPP to introduce multi-subframe scheduling for Rel-14 LAA where one or more UL grants transmitted in a single subframe can schedule UL data in multiple subframes. The parameters that are signaled as part of such a multi-subframe scheduling grant include HARQ-ACKs and related parameters. Specifically, the grants include the legacy parameters, i.e., the New Data Indicator (NDI), Redundancy Version (RV) and the HARQ-ACK bits themselves which in the general case consist of one bit per transport block that is being acknowledged.

6 Resource Allocations for Operation in Unlicensed Spectrum

The use of a carrier in an unlicensed spectrum needs to meet two requirements as per the regulations, an occupied channel bandwidth requirement and a maximum Power Spectral Density (PSD) requirement.

For example, both of these requirements are enforced for 5 GHz carriers according to ETSI 301 893 while only the maximum PSD requirements are enforced in the US regulation for 5 GHz.

The occupied bandwidth requirement, which is expressed as the bandwidth containing 99% of the power of the signal, shall be between 80% and 100% of the declared nominal channel bandwidth. This requirement is tested over a time interval longer than one subframe (1 ms). The frequency allocations for one UE must thus vary between subframes in such a way that the requirement is fulfilled. It is still an open issue if this requirement needs to be fulfilled for a UE which only transmits in a single subframe, such as Physical Random Access Channel (PRACH) or with a single PUSCH.

Maximum PSD requirements exist in many different regions. For most cases the requirement is stated with a resolution bandwidth of 1 MHz. For example, the ETSI 301 893 specs requires 10 decibel-milliwatt (dBm)/MHz for 5150-5350 MHz. The implication of the PSD requirement on the physical layer design is that, without proper designs, a signal with a small transmission bandwidth will be limited in transmission power. This can negatively affect coverage of the operation. That is, the maximum PSD requirement is a binding condition that requires changes to UL transmissions in unlicensed spectrum.

For operation in unlicensed spectrum, interlaced transmission has been identified as the best approach due to these PSD and bandwidth occupancy requirements set by regulations. An interlace is a set of Physical RBs (PRBs) that are spread out across the entire bandwidth. An approach that is being defined for systems in unlicensed spectrum is to have a uniformly spaced interlace where there is a single spacing between consecutive PRBs in frequency that is used. In the case of a 20 MHz LTE system where there are a hundred PRBs with 12 subcarriers each, a single interlace has been defined as having 10 PRBs that are evenly spaced. One constraint from an implementation point of view is that the number of PRBs transmitted by the UE should be a product of the factors 2, 3, or 5. The resource allocations in LTE meet this constraint.

Existing approaches for resource allocations do not account for all the constraints, especially when control signals such as PRACH need to be multiplexed with data transmissions. Furthermore, the existing approaches do not provide sufficient efficiency in signaling of resource allocations.

SUMMARY

Systems and methods are disclosed that relate to management of uplink transmissions in unlicensed spectrum. In some embodiments, a method of operation of a network node in a wireless communication network comprises signaling, to a wireless device, an indication of one or more allocated sets of resource blocks that are allocated to the wireless device by an uplink grant for transmission on an uplink carrier in an unlicensed frequency spectrum. The one or more allocated sets of resource blocks are one or more of a plurality of defined sets of resource blocks that correspond to a plurality of interlaces, respectively, that each spread out across an entire bandwidth of the uplink carrier. In this manner, higher uplink user and system performance can be obtained.

In some embodiments, the entire bandwidth of the uplink carrier corresponds to 100 resource blocks having resource block indices 0 through 99 starting at one edge of the entire bandwidth of the uplink carrier, and the one or more allocated sets of resource blocks comprise a first defined set of resource blocks for a first interlace consisting of resource blocks having resource block indices 0, 10, 20, 30, 40, 50, 60, 70, 80, and 90, and a second defined set of resource blocks for a second interlace consisting of resource blocks having resource block indices 5, 15, 25, 35, 45, 55, 65, 75, 85, and 95.

In some embodiments, the entire bandwidth of the uplink carrier corresponds to 100 resource blocks having resource block indices 0 through 99 starting at one edge of the entire bandwidth of the uplink carrier, and the one or more allocated sets of resource blocks comprise a first defined set of resource blocks for a first interlace consisting of resource blocks having resource block indices 1, 11, 21, 31, 41, 51, 61, 71, 81, and 91, and a second defined set of resource blocks for a second interlace consisting of resource blocks having resource block indices 6, 16, 26, 36, 46, 56, 66, 76, 86, and 96.

In some embodiments, the entire bandwidth of the uplink carrier corresponds to 100 resource blocks having resource block indices 0 through 99 starting at one edge of the entire bandwidth of the uplink carrier, and the one or more allocated sets of resource blocks comprise a first defined set of resource blocks for a first interlace consisting of resource blocks having resource block indices 2, 12, 22, 32, 42, 52, 62, 72, 82, and 92, and a second defined set of resource blocks for a second interlace consisting of resource blocks having resource block indices 7, 17, 27, 37, 47, 57, 67, 77, 87, and 97.

In some embodiments, the entire bandwidth of the uplink carrier corresponds to 100 resource blocks having resource block indices 0 through 99 starting at one edge of the entire bandwidth of the uplink carrier, and the one or more allocated sets of resource blocks comprise a first defined set of resource blocks for a first interlace consisting of resource blocks having resource block indices 3, 13, 23, 33, 43, 53, 63, 73, 83, and 93, and a second defined set of resource blocks for a second interlace consisting of resource blocks having resource block indices 8, 18, 28, 38, 48, 58, 68, 78, 88, and 98.

In some embodiments, the entire bandwidth of the uplink carrier corresponds to 100 resource blocks having resource block indices 0 through 99 starting at one edge of the entire bandwidth of the uplink carrier, and the one or more allocated sets of resource blocks comprise a first defined set of resource blocks for a first interlace consisting of resource blocks having resource block indices 4, 14, 24, 34, 44, 54, 64, 74, 84, and 94, and a second defined set of resource blocks for a second interlace consisting of resource blocks having resource block indices 9, 19, 29, 39, 49, 59, 69, 79, 89, and 99.

In some embodiments, the entire bandwidth of the uplink carrier corresponds to 100 resource blocks having resource block indices 0 through 99 starting at one edge of the entire bandwidth of the uplink carrier, and the one or more allocated sets of resource blocks comprise a first defined set of resource blocks for a first interlace consisting of resource blocks having resource block indices 0, 10, 20, 30, 40, 50, 60, 70, 80, and 90, a second defined set of resource blocks for a second interlace consisting of resource blocks having resource block indices 1, 11, 21, 31, 41, 51, 61, 71, 81, and 91, a third defined set of resource blocks for a third interlace consisting of resource blocks having resource block indices 5, 15, 25, 35, 45, 55, 65, 75, 85, and 95, and a fourth defined set of resource blocks for a fourth interlace consisting of resource blocks having resource block indices 6, 16, 26, 36, 46, 56, 66, 76, 86, and 96.

In some embodiments, the entire bandwidth of the uplink carrier corresponds to 100 resource blocks having resource block indices 0 through 99 starting at one edge of the entire bandwidth of the uplink carrier, and the one or more allocated sets of resource blocks comprise a first defined set of resource blocks for a first interlace consisting of resource blocks having resource block indices 1, 11, 21, 31, 41, 51, 61, 71, 81, and 91, a second defined set of resource blocks for a second interlace consisting of resource blocks having resource block indices 2, 12, 22, 32, 42, 52, 62, 72, 82, and 92, a third defined set of resource blocks for a third interlace consisting of resource blocks having resource block indices 3, 13, 23, 33, 43, 53, 63, 73, 83, and 93, a fourth defined set of resource blocks for a fourth interlace consisting of resource blocks having resource block indices 6, 16, 26, 36, 46, 56, 66, 76, 86, and 96, a fifth defined set of resource blocks for a fifth interlace consisting of resource blocks having resource block indices 7, 17, 27, 37, 47, 57, 67, 77, 87, and 97, and a sixth defined set of resource blocks for a sixth interlace consisting of resource blocks having resource block indices 8, 18, 28, 38, 48, 58, 68, 78, 88, and 98.

In some embodiments, the entire bandwidth of the uplink carrier corresponds to 100 resource blocks having resource block indices 0 through 99 starting at one edge of the entire bandwidth of the uplink carrier, and the one or more allocated sets of resource blocks comprise a first defined set of resource blocks for a first interlace consisting of resource blocks having resource block indices 1, 11, 21, 31, 41, 51, 61, 71, 81, and 91, a second defined set of resource blocks for a second interlace consisting of resource blocks having resource block indices 2, 12, 22, 32, 42, 52, 62, 72, 82, and 92, a third defined set of resource blocks for a third interlace consisting of resource blocks having resource block indices 3, 13, 23, 33, 43, 53, 63, 73, 83, and 93, a fourth defined set of resource blocks for a fourth interlace consisting of resource blocks having resource block indices 4, 14, 24, 34, 44, 54, 64, 74, 84, and 94, a fifth defined set of resource blocks for a fifth interlace consisting of resource blocks having resource block indices 6, 16, 26, 36, 46, 56, 66, 76, 86, and 96, a sixth defined set of resource blocks for a sixth interlace consisting of resource blocks having resource block indices 7, 17, 27, 37, 47, 57, 67, 77, 87, and 97, a seventh defined set of resource blocks for a seventh interlace consisting of resource blocks having resource block indices 8, 18, 28, 38, 48, 58, 68, 78, 88, and 98, and an eighth defined set of resource blocks for an eighth interlace consisting of resource blocks having resource block indices 9, 19, 29, 39, 49, 59, 69, 79, 89, and 99.

In some embodiments, the indication is one of a plurality of defined possible values for the indication, wherein the plurality of defined possible values comprise a plurality of different values that indicate different combinations of the plurality of defined sets of resource blocks for the plurality of interlaces, respectively.

In some embodiments, the entire bandwidth of the uplink carrier corresponds to 100 resource blocks having resource block indices 0 through 99 starting at one edge of the entire bandwidth of the uplink carrier, and the plurality of defined sets of resource blocks comprise a first defined set of resource blocks for a first interlace consisting of resource blocks having resource block indices 0, 10, 20, 30, 40, 50, 60, 70, 80, and 90, a second defined set of resource blocks for a second interlace consisting of resource blocks having resource block indices 1, 11, 21, 31, 41, 51, 61, 71, 81, and 91, a third defined set of resource blocks for a third interlace consisting of resource blocks having resource block indices 2, 12, 22, 32, 42, 52, 62, 72, 82, and 92, a fourth defined set of resource blocks for a fourth interlace consisting of resource blocks having resource block indices 3, 13, 23, 33, 43, 53, 63, 73, 83, and 93, a fifth defined set of resource blocks for a fifth interlace consisting of resource blocks having resource block indices 4, 14, 24, 34, 44, 54, 64, 74, 84, and 94, a sixth defined set of resource blocks for a sixth interlace consisting of resource blocks having resource block indices 5, 15, 25, 35, 45, 55, 65, 75, 85, and 95, a seventh defined set of resource blocks for a seventh interlace consisting of resource blocks having resource block indices 6, 16, 26, 36, 46, 56, 66, 76, 86, and 96, an eighth defined set of resource blocks for an eighth interlace consisting of resource blocks having resource block indices 7, 17, 27, 37, 47, 57, 67, 77, 87, and 97, a ninth defined set of resource blocks for a ninth interlace consisting of resource blocks having resource block indices 8, 18, 28, 38, 48, 58, 68, 78, 88, and 98, and a tenth defined set of resource blocks for a tenth interlace consisting of resource blocks having resource block indices 9, 19, 29, 39, 49, 59, 69, 79, 89, and 99.

In some embodiments, the indication is one of a plurality of defined values, wherein the plurality of defined values comprises a first value that indicates that the one or more allocated sets of resource blocks comprise the first defined set of resource blocks for the first interlace and the sixth defined set of resource blocks for the sixth interlace, a second value that indicates that the one or more allocated sets of resource blocks comprise the second defined set of resource blocks for the second interlace and the seventh defined set of resource blocks for the seventh interlace, a third value that indicates that the one or more allocated sets of resource blocks comprise the third defined set of resource blocks for the third interlace and the eighth defined set of resource blocks for the eighth interlace, a fourth value that indicates that the one or more allocated sets of resource blocks comprise the fourth defined set of resource blocks for the fourth interlace and the ninth defined set of resource blocks for the ninth interlace, a fifth value that indicates that the one or more allocated sets of resource blocks comprise the fifth defined set of resource blocks for the fifth interlace and the tenth defined set of resource blocks for the tenth interlace, a sixth value that indicates that the one or more allocated sets of resource blocks comprise the first defined set of resource blocks for the first interlace, the second defined set of resource blocks for the second interlace, the sixth defined set of resource blocks for the sixth interlace, and the seventh defined set of resource blocks for the seventh interlace, a seventh value that indicates that the one or more allocated sets of resource blocks comprise the second defined set of resource blocks for the second interlace, the third defined set of resource blocks for the third interlace, the fourth defined set of resource blocks for the fourth interlace, the seventh defined set of resource blocks for the seventh interlace, the eighth defined set of resource blocks for the eighth interlace, and the ninth defined set of resource blocks for the ninth interlace, and an eighth value that indicates that the one or more allocated sets of resource blocks comprise the second defined set of resource blocks for the second interlace, the third defined set of resource blocks for the third interlace, the fourth defined set of resource blocks for the fourth interlace, the fifth defined set of resource blocks for the fifth interlace, the seventh defined set of resource blocks for the seventh interlace, the eighth defined set of resource blocks for the eighth interlace, the ninth defined set of resource blocks for the ninth interlace, and the tenth defined set of resource blocks for the tenth interlace.

In some embodiments, the indication is comprised in the uplink grant.

Embodiments of a network node for a wireless communication network are also disclosed. In some embodiments, a network node for a wireless communication network is adapted to signal, to a wireless device, an indication of one or more allocated sets of resource blocks that are allocated to the wireless device by an uplink grant for transmission on an uplink carrier in an unlicensed frequency spectrum. The one or more allocated sets of resource blocks are one or more of a plurality of defined sets of resource blocks that correspond to a plurality of interlaces, respectively, that each spread out across an entire bandwidth of the uplink carrier.

In some embodiments, a network node for a wireless communication network comprises a processor and memory storing instructions executable by the processor whereby the network node is operable to signal, to a wireless device, an indication of one or more allocated sets of resource blocks that are allocated to the wireless device by an uplink grant for transmission on an uplink carrier in an unlicensed frequency spectrum. The one or more allocated sets of resource blocks are one or more of a plurality of defined sets of resource blocks that correspond to a plurality of interlaces, respectively, that each spread out across an entire bandwidth of the uplink carrier.

In some embodiments, a network node for a wireless communication network comprises a signaling module operable to signal, to a wireless device, an indication of one or more allocated sets of resource blocks that are allocated to the wireless device by an uplink grant for transmission on an uplink carrier in an unlicensed frequency spectrum. The one or more allocated sets of resource blocks are one or more of a plurality of defined sets of resource blocks that correspond to a plurality of interlaces, respectively, that each spread out across an entire bandwidth of the uplink carrier.

Embodiments of a method operation of a wireless device in a wireless communication network are also disclosed. In some embodiments, a method of operation of a wireless device in a wireless communication network comprises receiving, from a network node, an indication of one or more allocated sets of resource blocks that are allocated to the wireless device by an uplink grant for transmission on an uplink carrier in an unlicensed frequency spectrum. The one or more allocated sets of resource blocks are one or more of a plurality of defined sets of resource blocks that correspond to a plurality of interlaces, respectively, that each spread out across an entire bandwidth of the uplink carrier. The method further comprises performing uplink transmission on the uplink carrier in accordance with the indication of the one or more allocated sets of resource blocks.

In some embodiments, the entire bandwidth of the uplink carrier corresponds to 100 resource blocks having resource block indices 0 through 99 starting at one edge of the entire bandwidth of the uplink carrier, and the one or more allocated sets of resource blocks comprise a first defined set of resource blocks for a first interlace consisting of resource blocks having resource block indices 0, 10, 20, 30, 40, 50, 60, 70, 80, and 90, and a second defined set of resource blocks for a second interlace consisting of resource blocks having resource block indices 5, 15, 25, 35, 45, 55, 65, 75, 85, and 95.

In some embodiments, the entire bandwidth of the uplink carrier corresponds to 100 resource blocks having resource block indices 0 through 99 starting at one edge of the entire bandwidth of the uplink carrier, and the one or more allocated sets of resource blocks comprise a first defined set of resource blocks for a first interlace consisting of resource blocks having resource block indices 1, 11, 21, 31, 41, 51, 61, 71, 81, and 91, and a second defined set of resource blocks for a second interlace consisting of resource blocks having resource block indices 6, 16, 26, 36, 46, 56, 66, 76, 86, and 96.

In some embodiments, the entire bandwidth of the uplink carrier corresponds to 100 resource blocks having resource block indices 0 through 99 starting at one edge of the entire bandwidth of the uplink carrier, and the one or more allocated sets of resource blocks comprise a first defined set of resource blocks for a first interlace consisting of resource blocks having resource block indices 2, 12, 22, 32, 42, 52, 62, 72, 82, and 92, and a second defined set of resource blocks for a second interlace consisting of resource blocks having resource block indices 7, 17, 27, 37, 47, 57, 67, 77, 87, and 97.

In some embodiments, the entire bandwidth of the uplink carrier corresponds to 100 resource blocks having resource block indices 0 through 99 starting at one edge of the entire bandwidth of the uplink carrier, and the one or more allocated sets of resource blocks comprise a first defined set of resource blocks for a first interlace consisting of resource blocks having resource block indices 3, 13, 23, 33, 43, 53, 63, 73, 83, and 93, and a second defined set of resource blocks for a second interlace consisting of resource blocks having resource block indices 8, 18, 28, 38, 48, 58, 68, 78, 88, and 98.

In some embodiments, the entire bandwidth of the uplink carrier corresponds to 100 resource blocks having resource block indices 0 through 99 starting at one edge of the entire bandwidth of the uplink carrier, and the one or more allocated sets of resource blocks comprise a first defined set of resource blocks for a first interlace consisting of resource blocks having resource block indices 4, 14, 24, 34, 44, 54, 64, 74, 84, and 94, and a second defined set of resource blocks for a second interlace consisting of resource blocks having resource block indices 9, 19, 29, 39, 49, 59, 69, 79, 89, and 99.

In some embodiments, the entire bandwidth of the uplink carrier corresponds to 100 resource blocks having resource block indices 0 through 99 starting at one edge of the entire bandwidth of the uplink carrier, and the one or more allocated sets of resource blocks comprise a first defined set of resource blocks for a first interlace consisting of resource blocks having resource block indices 0, 10, 20, 30, 40, 50, 60, 70, 80, and 90, a second defined set of resource blocks for a second interlace consisting of resource blocks having resource block indices 1, 11, 21, 31, 41, 51, 61, 71, 81, and 91, a third defined set of resource blocks for a third interlace consisting of resource blocks having resource block indices 5, 15, 25, 35, 45, 55, 65, 75, 85, and 95, and a fourth defined set of resource blocks for a fourth interlace consisting of resource blocks having resource block indices 6, 16, 26, 36, 46, 56, 66, 76, 86, and 96.

In some embodiments, the entire bandwidth of the uplink carrier corresponds to 100 resource blocks having resource block indices 0 through 99 starting at one edge of the entire bandwidth of the uplink carrier, and the one or more allocated sets of resource blocks comprise a first defined set of resource blocks for a first interlace consisting of resource blocks having resource block indices 1, 11, 21, 31, 41, 51, 61, 71, 81, and 91, a second defined set of resource blocks for a second interlace consisting of resource blocks having resource block indices 2, 12, 22, 32, 42, 52, 62, 72, 82, and 92, a third defined set of resource blocks for a third interlace consisting of resource blocks having resource block indices 3, 13, 23, 33, 43, 53, 63, 73, 83, and 93, a fourth defined set of resource blocks for a fourth interlace consisting of resource blocks having resource block indices 6, 16, 26, 36, 46, 56, 66, 76, 86, and 96, a fifth defined set of resource blocks for a fifth interlace consisting of resource blocks having resource block indices 7, 17, 27, 37, 47, 57, 67, 77, 87, and 97, and a sixth defined set of resource blocks for a sixth interlace consisting of resource blocks having resource block indices 8, 18, 28, 38, 48, 58, 68, 78, 88, and 98.

In some embodiments, the entire bandwidth of the uplink carrier corresponds to 100 resource blocks having resource block indices 0 through 99 starting at one edge of the entire bandwidth of the uplink carrier, and the one or more allocated sets of resource blocks comprise a first defined set of resource blocks for a first interlace consisting of resource blocks having resource block indices 1, 11, 21, 31, 41, 51, 61, 71, 81, and 91, a second defined set of resource blocks for a second interlace consisting of resource blocks having resource block indices 2, 12, 22, 32, 42, 52, 62, 72, 82, and 92, a third defined set of resource blocks for a third interlace consisting of resource blocks having resource block indices 3, 13, 23, 33, 43, 53, 63, 73, 83, and 93, a fourth defined set of resource blocks for a fourth interlace consisting of resource blocks having resource block indices 4, 14, 24, 34, 44, 54, 64, 74, 84, and 94, a fifth defined set of resource blocks for a fifth interlace consisting of resource blocks having resource block indices 6, 16, 26, 36, 46, 56, 66, 76, 86, and 96, a sixth defined set of resource blocks for a sixth interlace consisting of resource blocks having resource block indices 7, 17, 27, 37, 47, 57, 67, 77, 87, and 97, a seventh defined set of resource blocks for a seventh interlace consisting of resource blocks having resource block indices 8, 18, 28, 38, 48, 58, 68, 78, 88, and 98, and an eighth defined set of resource blocks for an eighth interlace consisting of resource blocks having resource block indices 9, 19, 29, 39, 49, 59, 69, 79, 89, and 99.

In some embodiments, the indication is one of a plurality of defined possible values for the indication, wherein the plurality of defined possible values comprise a plurality of different values that indicate different combinations of the plurality of defined sets of resource blocks for the plurality of interlaces, respectively.

In some embodiments, the entire bandwidth of the uplink carrier corresponds to 100 resource blocks having resource block indices 0 through 99 starting at one edge of the entire bandwidth of the uplink carrier, and the plurality of defined sets of resource blocks comprise a first defined set of resource blocks for a first interlace consisting of resource blocks having resource block indices 0, 10, 20, 30, 40, 50, 60, 70, 80, and 90, a second defined set of resource blocks for a second interlace consisting of resource blocks having resource block indices 1, 11, 21, 31, 41, 51, 61, 71, 81, and 91, a third defined set of resource blocks for a third interlace consisting of resource blocks having resource block indices 2, 12, 22, 32, 42, 52, 62, 72, 82, and 92, a fourth defined set of resource blocks for a fourth interlace consisting of resource blocks having resource block indices 3, 13, 23, 33, 43, 53, 63, 73, 83, and 93, a fifth defined set of resource blocks for a fifth interlace consisting of resource blocks having resource block indices 4, 14, 24, 34, 44, 54, 64, 74, 84, and 94, a sixth defined set of resource blocks for a sixth interlace consisting of resource blocks having resource block indices 5, 15, 25, 35, 45, 55, 65, 75, 85, and 95, a seventh defined set of resource blocks for a seventh interlace consisting of resource blocks having resource block indices 6, 16, 26, 36, 46, 56, 66, 76, 86, and 96, an eighth defined set of resource blocks for an eighth interlace consisting of resource blocks having resource block indices 7, 17, 27, 37, 47, 57, 67, 77, 87, and 97, a ninth defined set of resource blocks for a ninth interlace consisting of resource blocks having resource block indices 8, 18, 28, 38, 48, 58, 68, 78, 88, and 98, and a tenth defined set of resource blocks for a tenth interlace consisting of resource blocks having resource block indices 9, 19, 29, 39, 49, 59, 69, 79, 89, and 99.

In some embodiments, the indication is one of a plurality of defined values, wherein the plurality of defined values comprises a first value that indicates that the one or more allocated sets of resource blocks comprise the first defined set of resource blocks for the first interlace and the sixth defined set of resource blocks for the sixth interlace, a second value that indicates that the one or more allocated sets of resource blocks comprise the second defined set of resource blocks for the second interlace and the seventh defined set of resource blocks for the seventh interlace, a third value that indicates that the one or more allocated sets of resource blocks comprise the third defined set of resource blocks for the third interlace and the eighth defined set of resource blocks for the eighth interlace, a fourth value that indicates that the one or more allocated sets of resource blocks comprise the fourth defined set of resource blocks for the fourth interlace and the ninth defined set of resource blocks for the ninth interlace, a fifth value that indicates that the one or more allocated sets of resource blocks comprise the fifth defined set of resource blocks for the fifth interlace and the tenth defined set of resource blocks for the tenth interlace, a sixth value that indicates that the one or more allocated sets of resource blocks comprise the first defined set of resource blocks for the first interlace, the second defined set of resource blocks for the second interlace, the sixth defined set of resource blocks for the sixth interlace, and the seventh defined set of resource blocks for the seventh interlace, a seventh value that indicates that the one or more allocated sets of resource blocks comprise the second defined set of resource blocks for the second interlace, the third defined set of resource blocks for the third interlace, the fourth defined set of resource blocks for the fourth interlace, the seventh defined set of resource blocks for the seventh interlace, the eighth defined set of resource blocks for the eighth interlace, and the ninth defined set of resource blocks for the ninth interlace, and an eighth value that indicates that the one or more allocated sets of resource blocks comprise the second defined set of resource blocks for the second interlace, the third defined set of resource blocks for the third interlace, the fourth defined set of resource blocks for the fourth interlace, the fifth defined set of resource blocks for the fifth interlace, the seventh defined set of resource blocks for the seventh interlace, the eighth defined set of resource blocks for the eighth interlace, the ninth defined set of resource blocks for the ninth interlace, and the tenth defined set of resource blocks for the tenth interlace.

In some embodiments, the indication is comprised in the uplink grant.

Embodiments of a wireless device for a wireless communication network are also disclosed. In some embodiments, a wireless device for a wireless communication network is adapted to receive, from a network node, an indication of one or more allocated sets of resource blocks that are allocated to the wireless device by an uplink grant for transmission on an uplink carrier in an unlicensed frequency spectrum. The one or more allocated sets of resource blocks are one or more of a plurality of defined sets of resource blocks that correspond to a plurality of interlaces, respectively, that each spread out across an entire bandwidth of the uplink carrier. The wireless device is further adapted to perform uplink transmission on the uplink carrier in accordance with the indication of the one or more allocated sets of resource blocks.

In some embodiments, a wireless device for a wireless communication network comprises a processor and memory storing instructions executable by the processor whereby the wireless device is operable to receive, from a network node, an indication of one or more allocated sets of resource blocks that are allocated to the wireless device by an uplink grant for transmission on an uplink carrier in an unlicensed frequency spectrum and perform uplink transmission on the uplink carrier in accordance with the indication of the one or more allocated sets of resource blocks. The one or more allocated sets of resource blocks are one or more of a plurality of defined sets of resource blocks that correspond to a plurality of interlaces, respectively, that each spread out across an entire bandwidth of the uplink carrier.

In some embodiments, a wireless device for a wireless communication network comprises a receiving module and a performing module. The receiving module is operable to receive, from a network node, an indication of one or more allocated sets of resource blocks that are allocated to the wireless device by an uplink grant for transmission on an uplink carrier in an unlicensed frequency spectrum. The one or more allocated sets of resource blocks are one or more of a plurality of defined sets of resource blocks that correspond to a plurality of interlaces, respectively, that each spread out across an entire bandwidth of the uplink carrier. The performing module is operable to perform uplink transmission on the uplink carrier in accordance with the indication of the one or more allocated sets of resource blocks.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
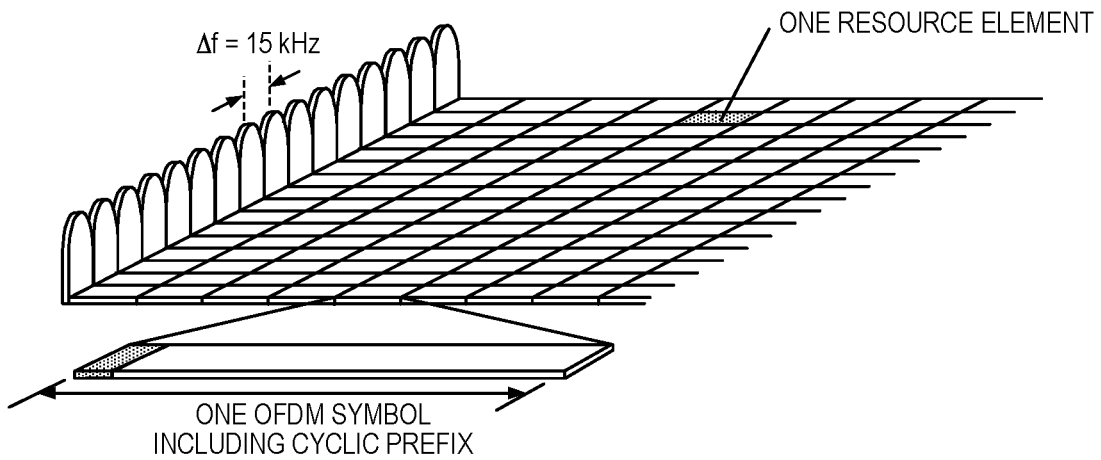
FIG. 1 illustrates an example Long Term Evolution (LTE) downlink (DL) physical resource.
Figure 2:
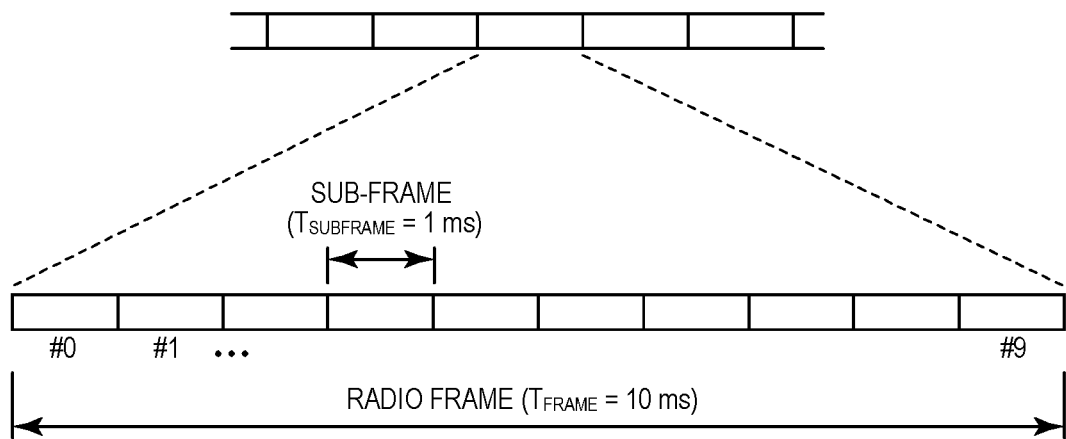
FIG. 2 illustrates an example LTE time-domain structure.
Figure 3:
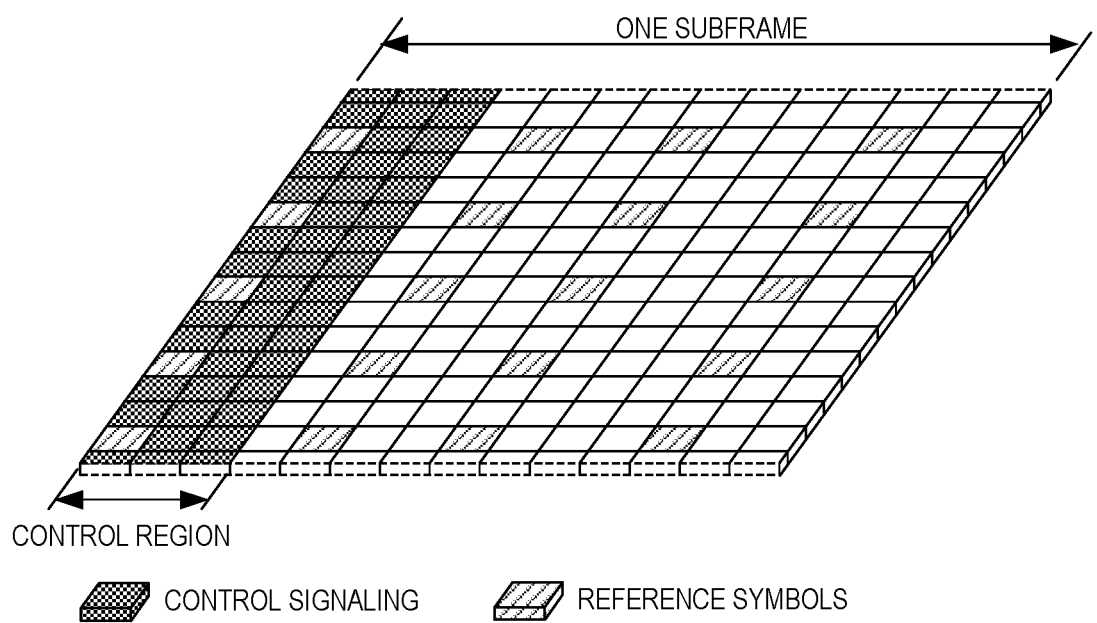
FIG. 3 illustrates an example DL subframe.
Figure 4:
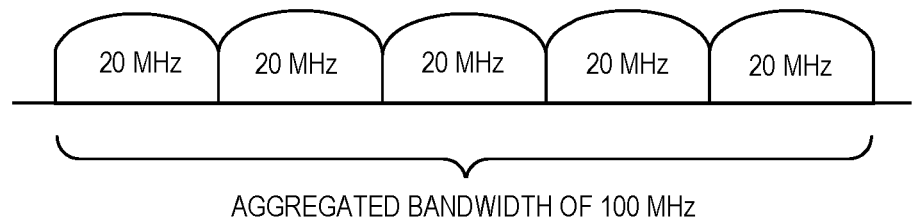
FIG. 4 illustrates an example of Carrier Aggregation (CA)
Figure 5:
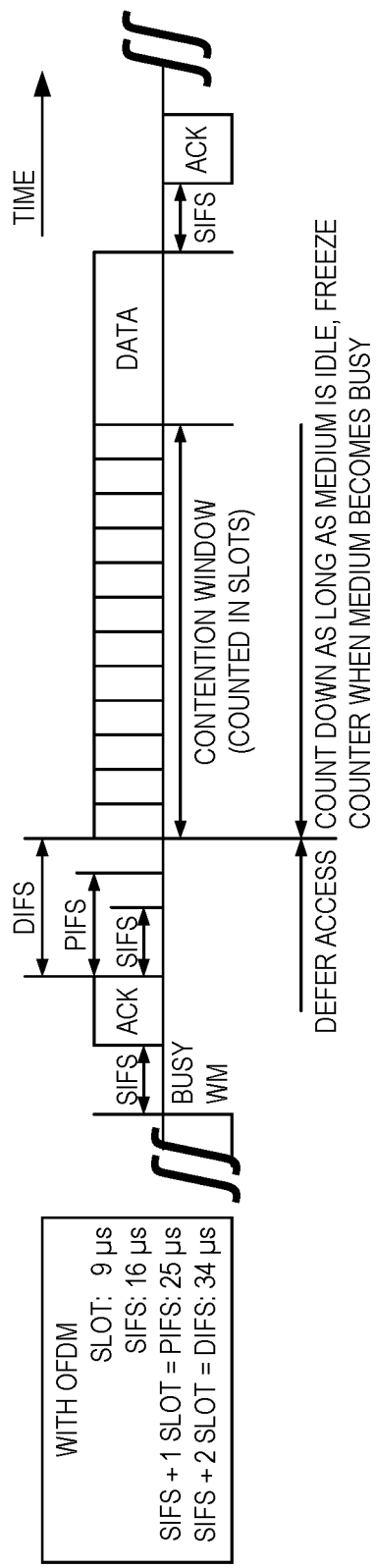
FIG. 5 illustrates an example of Listen-Before-Talk (LBT) in Wi-Fi™
Figure 6:
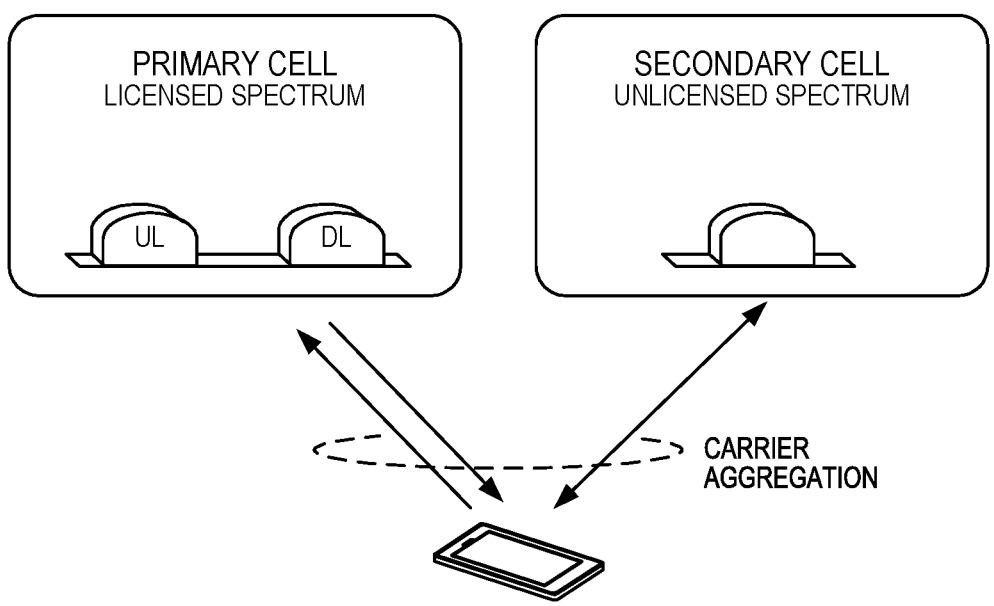
FIG. 6 illustrates an example of a CA-capable User Equipment device (UE) configured with one License Assisted Access (LAA) Secondary Cell (SCell)
Figure 7:
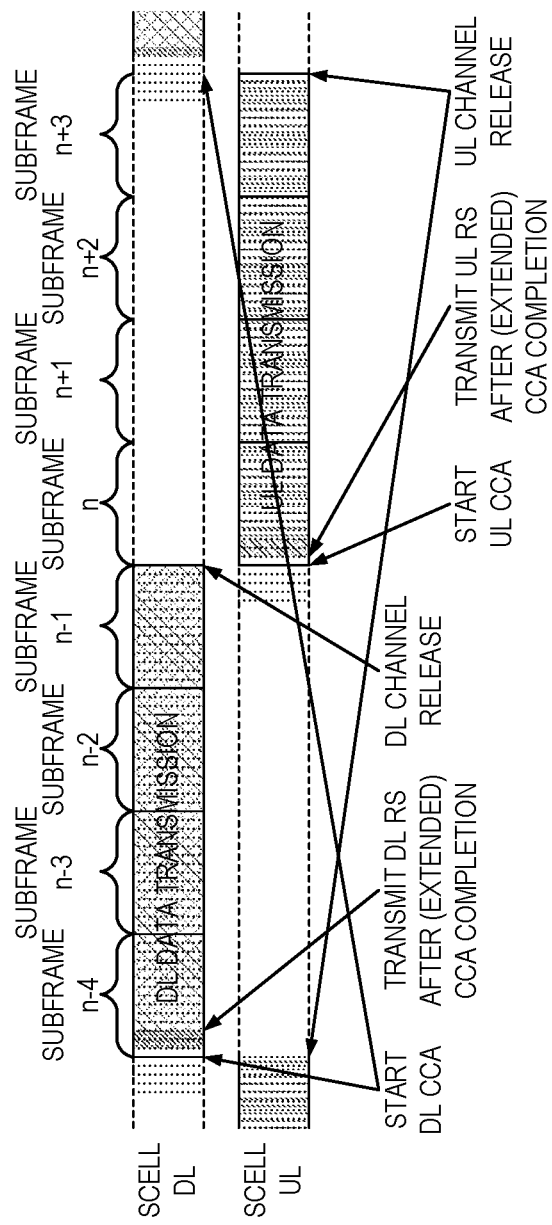
FIG. 7 illustrates an example of LAA to unlicensed spectrum using LTE CA and LBT to ensure good coexistence with other unlicensed band technologies.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

As described above, existing approaches for resource allocations do not account for all the constraints, especially when control signals such as Physical Random Access Channel (PRACH) need to be multiplexed with data transmissions. Furthermore, the existing approaches do not provide sufficient efficiency in signaling of resource allocations. The present disclosure contemplates various embodiments that may address these and other deficiencies associated with existing approaches. For example, certain embodiments may provide solutions for signaling of uplink (UL) resource allocations, taking into account the possible multiplexing of coexisting signals that have a different frequency resource granularity. Certain embodiments may enable the management of UL transmissions in unlicensed spectrum by providing the ability to vary the gaps between transmissions by different nodes. Signaling to enable this functionality is disclosed. The various embodiments described herein may have one or more advantages. For example, certain embodiments may allow higher UL user and system performance to be obtained.

To address the foregoing problems with existing solutions, the present disclosure contemplates various embodiments that may enable the management of UL transmissions in unlicensed spectrum by providing the ability to vary the gaps between transmissions by different nodes. Signaling to enable this functionality is disclosed.

According to one example embodiment, a method in a node is disclosed. The method comprises designing a resource allocation for a transmission in unlicensed spectrum based on one or more criteria. The method comprises signaling the designed resource allocation to a User Equipment device (UE). Optionally, in certain embodiments one or more of the following may apply:

the one or more criteria may comprise one or more of: an allowed transmit power; bandwidth occupancy requirements; channel estimation performance; number of Resource Blocks (RBs) being a product of the factors 2, 3, or 5; pruning due to presence of other signals such as PRACH; and reduction of number of signaled bits; and the method may comprise signaling a structure of the designed resource allocation to the UE.

According to another example embodiment, a method in a UE is disclosed. The method comprises receiving a resource allocation for a transmission in unlicensed spectrum, the resource allocation designed based on one or more criteria. The method comprises performing a transmission in unlicensed spectrum according to the received resource allocation. Optionally, in certain embodiments one or more of the following may apply:

the one or more criteria may comprise one or more of: an allowed transmit power; bandwidth occupancy requirements; channel estimation performance; number of RBs being a product of the factors 2, 3, or 5; pruning due to presence of other signals such as PRACH; and reduction of number of signaled bits; and the method may comprise receiving a structure of the resource allocation.

Certain embodiments of the present disclosure may provide one or more technical advantages. For example, certain embodiments may allow higher UL user and system performance to be obtained. Other advantages may be readily apparent to one having skill in the art. Certain embodiments may have none, some, or all of the recited advantages.

Figure 8:
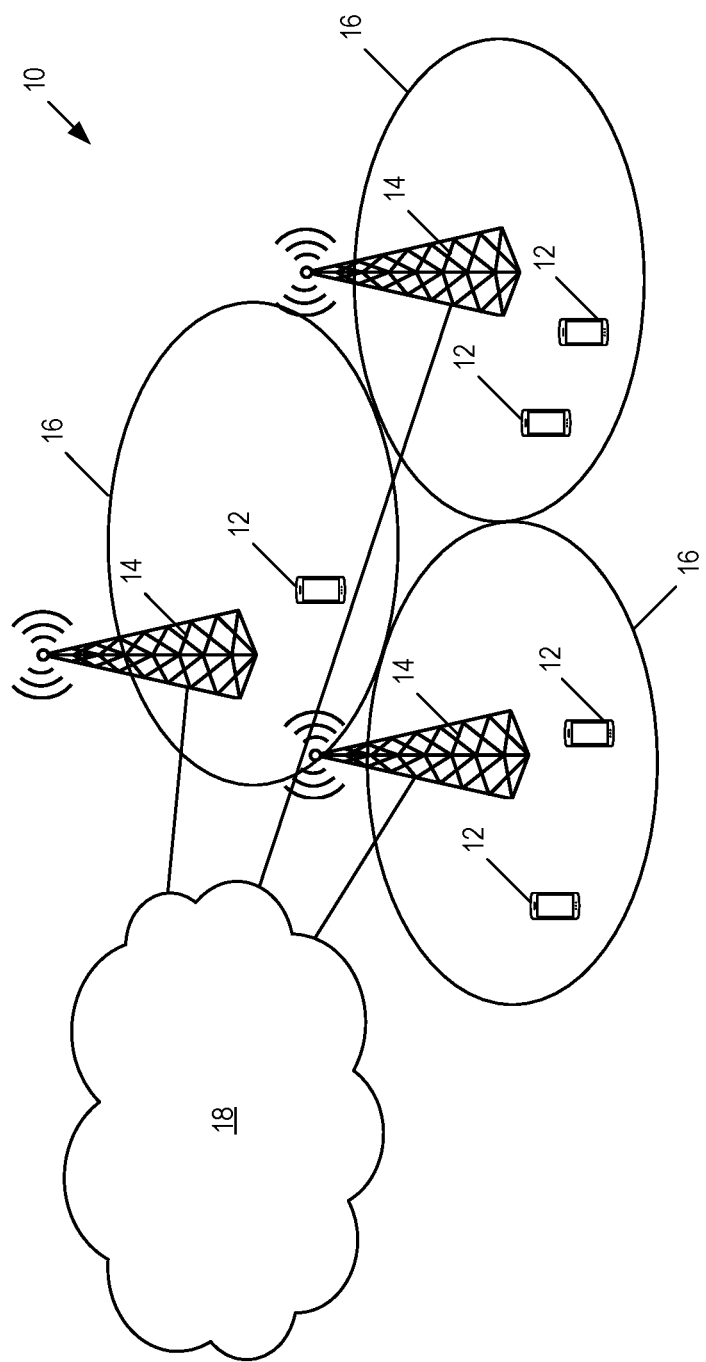
FIG. 8 illustrates an example embodiment of a wireless communications network in accordance with certain embodiments.

FIG. 8 illustrates an example embodiment of a wireless communications network 10, in accordance with certain embodiments. The wireless communications network 10 includes one or more UE(s) 12 (which may be interchangeably referred to herein as wireless devices 12) and one or more network node(s) 14 (which may be interchangeably referred to as enhanced or evolved Node Bs (eNBs) 14 or more generally radio network nodes 14). The UEs 12 may communicate with the network nodes 14 over a wireless interface. For example, a UE 12 may transmit wireless signals to one or more network nodes 14 and/or receive wireless signals from one or more network nodes 14. The wireless signals may contain voice traffic, data traffic, control signals, and/or any other suitable information. In some embodiments, an area of wireless signal coverage associated with a network node 14 may be referred to as a cell 16. In some embodiments, the UEs 12 may have Device-to-Device (D2D) capability. Thus, the UEs 12 may be able to receive signals from and/or transmit signals directly to another UE 12.

In certain embodiments, the network nodes 14 may interface with a radio network controller (not shown). The radio network controller may control the network nodes 14 and may provide certain radio resource management functions, mobility management functions, and/or other suitable functions. In certain embodiments, the functions of the radio network controller may be included in the network node 14. The radio network controller may interface with a core network node included in a core network 18. In certain embodiments, the radio network controller may interface with the core network node via an interconnecting network. Interconnecting network may refer to any interconnecting system capable of transmitting audio, video, signals, data, messages, or any combination of the preceding. The interconnecting network may include all or a portion of a Public Switched Telephone Network (PSTN), a public or private data network, a Local Area Network (LAN), a Metropolitan Area Network (MAN), a Wide Area Network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for the UEs 12. The UEs 12 may exchange certain signals with the core network node using the non-access stratum layer. In non-access stratum signaling, signals between the UEs 12 and the core network node may be transparently passed through the radio access network. In certain embodiments, the network nodes 14 may interface with one or more network nodes over an internode interface, such as, for example, an X2 interface.

As described above, example embodiments of the wireless communications network 10 may include one or more wireless devices 12 and one or more different types of network nodes capable of communicating (directly or indirectly) with the wireless devices 12.

In some embodiments, the non-limiting term UE is used. UEs 12 described herein can be any type of wireless device capable of communicating with the network nodes 14 or another UE over radio signals. The UE 12 may also be a radio communication device, a target device, a D2D UE, a Machine Type Communication (MTC) UE or a UE capable of Machine-to-Machine (M2M) communication, a low-cost and/or low-complexity UE, a sensor equipped with a UE, a tablet, mobile terminals, a smart phone, Laptop Embedded Equipment (LEE), Laptop Mounted Equipment (LME), Universal Serial Bus (USB) dongles, Customer Premises Equipment (CPE), etc. The UE 12 may operate under either normal coverage or enhanced coverage with respect to its serving cell. The enhanced coverage may be interchangeably referred to as extended coverage. The UE 12 may also operate in a plurality of coverage levels (e.g., normal coverage, enhanced coverage level 1, enhanced coverage level 2, enhanced coverage level 3, and so on). In some cases, the UE 12 may also operate in out-of-coverage scenarios.

Also, in some embodiments, the generic terminology "radio network node" (or simply "network node") is used. It can be any kind of network node, which may comprise a base station, a radio base station, a Node B, a Multi-Standard Radio (MSR) radio node such as a MSR base station, an eNB, a network controller, a Radio Network Controller (RNC), a Base Station Controller (BSC), a relay node, a relay donor node controlling relay, a Base Transceiver Station (BTS), an Access Point (AP), a radio AP, transmission points, transmission nodes, a Remote Radio Unit (RRU), a Remote Radio Head (RRH), nodes in a Distributed Antenna System (DAS), a Multi-cell/Multicast Coordination Entity (MCE), a core network node (e.g., a Mobile Switching Center (MSC), a Mobility Management Entity (MME), etc.), Operation and Management (O&M), an Operations Support System (OSS), a Self-Organizing Network (SON), a positioning node (e.g., an Evolved Serving Mobile Location Center (E-SMLC)), Minimization of Drive Tests (MDT), or any other suitable network node.

The terminology such as network node and UE should be considered non-limiting and does in particular not imply a certain hierarchical relation between the two; in general "eNB" could be considered as device 1 and "UE" device 2, and these two devices communicate with each other over some radio channel.

Example embodiments of the UE 12, the network nodes 14, and other network nodes (such as a radio network controller or a core network node) are described in more detail below with respect to FIGS. 12-16.

Although FIG. 8 illustrates a particular arrangement of the wireless communications network 10, the present disclosure contemplates that the various embodiments described herein may be applied to a variety of networks having any suitable configuration. For example, the wireless communications network 10 may include any suitable number of UEs 12 and network nodes 14, as well as any additional elements suitable to support communication between UEs or between a UE and another communication device (such as a landline telephone). Furthermore, although certain embodiments may be described as implemented in a Long Term Evolution (LTE) network, the embodiments may be implemented in any appropriate type of telecommunication system supporting any suitable communication standards (including Fifth Generation (5G) standards) and using any suitable components, and are applicable to any Radio Access Technology (RAT) or multi-RAT systems in which a UE receives and/or transmits signals (e.g., data). For example, the various embodiments described herein may be applicable to LTE, LTE-Advanced, 5G, Universal Mobile Telecommunications System (UMTS), High Speed Packet Access (HSPA), Global System for Mobile Communications (GSM), Code Division Multiple Access 2000 (CDMA2000), Wideband CDMA (W-CDMA), WiMax™, Ultra Mobile Broadband (UMB), Wi-Fi, another suitable RAT, or any suitable combination of one or more RATs. Although certain embodiments may be described in the context of wireless transmissions in the downlink (DL), the present disclosure contemplates that the various embodiments are equally applicable in the UL.

The various embodiments described herein are applicable to both License Assisted Access (LAA) LTE and standalone LTE-Unlicensed (LTE-U) operation and in general for any system such as LTE operating in unlicensed spectrum or any spectrum where Listen-Before-Talk (LBT) protocols are used and where there is a notion of multi-cluster UL transmissions.

Embodiment 1—Signaling of Resource Allocations
1

In this embodiment, resource allocation restrictions are designed based on at least the following criteria:
1) Allowed transmit power
2) Bandwidth occupancy requirements
3) Channel estimation performance
4) Number of RBs being a product of the factors 2, 3, or 5
5) Pruning due to presence of other signals such as PRACH
6) Reduction of number of signaled bits The restricted resource allocations are then signaled to the UE 12. In this embodiment, the restriction of allocations and the associated signaling is addressed. The subsequent embodiments address the particulars of pruning due to the presence of other signals such as PRACH.

Figure 9:
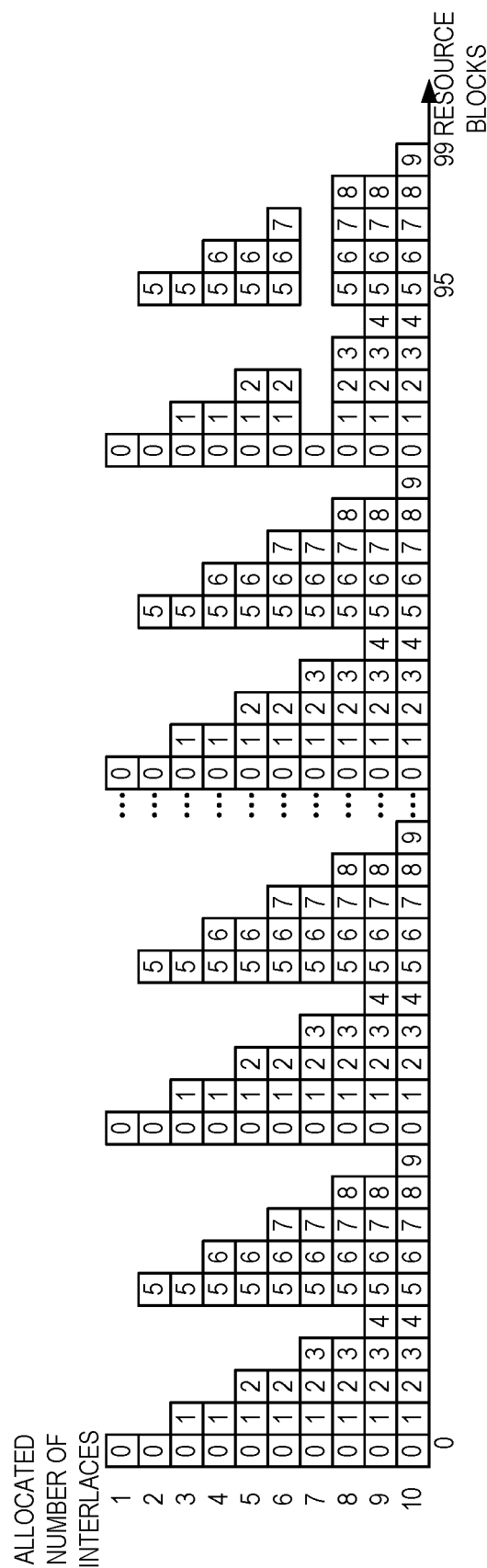
FIG. 9 illustrates an example of Resource Block (RB) mapping when using ten interlaces in accordance with certain embodiments.

FIG. 9 illustrates an example of RB mapping when using ten interlaces, in accordance with certain embodiments. More particularly, FIG. 9 shows resource allocations that allow for the maximum possible power that can be transmitted given a certain number of interlaces that are allocated and at the same time group transmitted Physical RBs (PRBs) together as much as possible to improve channel estimation performance at the receiver. At the same time constraints of being a product of the factors 2, 3, and 5 is satisfied. In this embodiment, the number of bits needed for resource allocation signaling is reduced by considering some possible scheduling options based on the limited allocations shown in FIG. 9.

In other words, FIG. 9 illustrates 100 PRBs numbered, or indexed, as PRB 0 through PRB 99 starting from one end, or edge, of the system bandwidth. There are ten interlaces numbered, or indexed, as interlaces 0 through 9. Interlace 0 is formed by a defined set of RBs consisting of PRBs 0, 10, 20, 30, 40, 50, 60, 70, 80, and 90; interlace 1 is formed by a defined set of RBs consisting of PRBs 1, 11, 21, 31, 41, 51, 61, 71, 81, and 91; interlace 2 is formed by a defined set of RBs consisting of PRBs 2, 12, 22, 32, 42, 52, 62, 72, 82, and 92, interlace 3 is formed by a defined set of RBs consisting of PRBs 3, 13, 23, 33, 43, 53, 63, 73, 83, and 93; interlace 4 is formed by a defined set of RBs consisting of PRBs 4, 14, 24, 34, 44, 54, 64, 74, 84, and 94; interlace 5 is formed by a defined set of RBs consisting of PRBs 5, 15, 25, 35, 45, 55, 65, 75, 85, and 95; interlace 6 is formed by a defined set of RBs consisting of PRBs 6, 16, 26, 36, 46, 56, 66, 76, 86, and 96; interlace 7 is formed by a defined set of RBs consisting of PRBs 7, 17, 27, 37, 47, 57, 67, 77, 87, and 97; interlace 8 is formed by a defined set of RBs consisting of PRBs 8, 18, 28, 38, 48, 58, 68, 78, 88, and 98; and interlace 9 is formed by a defined set of RBs consisting of PRBs 9, 19, 29, 39, 49, 59, 69, 79, 89, and 99.

A resource allocation for a UL grant is signaled to the UE 12. The resource allocation is an allocation of one or more of the interlaces that are allocated to the UE 12 for the UL grant. For example, the UE 12 may be allocated interlace 0 in which case an indication of this resource allocation is signaled to the UE 12, e.g., in the UL grant. As another example, the UE 12 may be allocated interlaces 0, 1, 5, and 6, in which case an indication of this resource allocation is signaled to the UE 12, e.g., in the UL grant.

Table 1 below shows the number of possibilities for scheduling given a certain number of interlaces if the allocations were restricted to the ones shown in FIG. 9. As can be seen, there are a total of 41 possible allocations that can be made. In order to signal which one of these is the allocation being granted in a particular UL grant, six bits are needed. The use of six bits can cover 64 possibilities. Therefore, there are 25 more possible combinations that can be considered. In an aspect of this embodiment, the remaining combinations are allocated to possible allocations of two and three interlaces that are not shown in FIG. 9. For instance, there are 25 ways to choose two out of the ten interlaces. One possibility is for 23 of these to be chosen to be added to the list of possibilities in the table so that these can be signaled with the use of six bits. Another possibility is for a fewer number of combinations for two interlaces to be added to the table and a few more combinations of three interlaces to be added. It is also possible for one of the above values for number of interlaces allocated to be eliminated, for example, seven interlaces for a single UE 12 may not be a valid allocation due to the need to prune the number of usable RBs down to 64. This increases the number of combinations for the remaining entries that can be signaled. A similar table with the first five rows of column 1 in Table 1 can be constructed for the case of 10 megahertz (MHz) system bandwidth, assuming a total of five available interlaces with ten RBs per interlace. In this case, either fewer than six bits can be used for the allocation indication, or six bits can be retained with the inclusion of additional combinations.

TABLE 1

Number of possibilities for interlaced based allocation based on the restricted resource block mapping shown in FIG. 9.

| Number of interlaces allocated | Number of possibilities | Description |
| --- | --- | --- |
| 1 | 10 | A single interlace can be in any one of ten positions |
| 2 | 5 | Two interlaces allocated as shown in the figure can be in any one of 5 positions |
| 3 | 5 | . . . |
| 4 | 4 | . . . |
| 5 | 4 | . . . |
| 6 | 3 | . . . |
| 7 | 5 | . . . |
| 8 | 2 | . . . |
| 9 | 2 | . . . |
| 10 | 1 | . . . |
| Total: 41 | | . . . |

In another aspect of this embodiment, the structure of the resource allocations (as in the example shown in FIG. 9) themselves are signaled to the UE 12 via Radio Resource Control (RRC) signaling. A default table is to be used by the UE 12 unless it receives an alternate version via signaling. This allows any UEs 12 performing initial access and receiving allocations to use the default table before they have the opportunity to receive a different table via RRC signaling.

Figure 10:
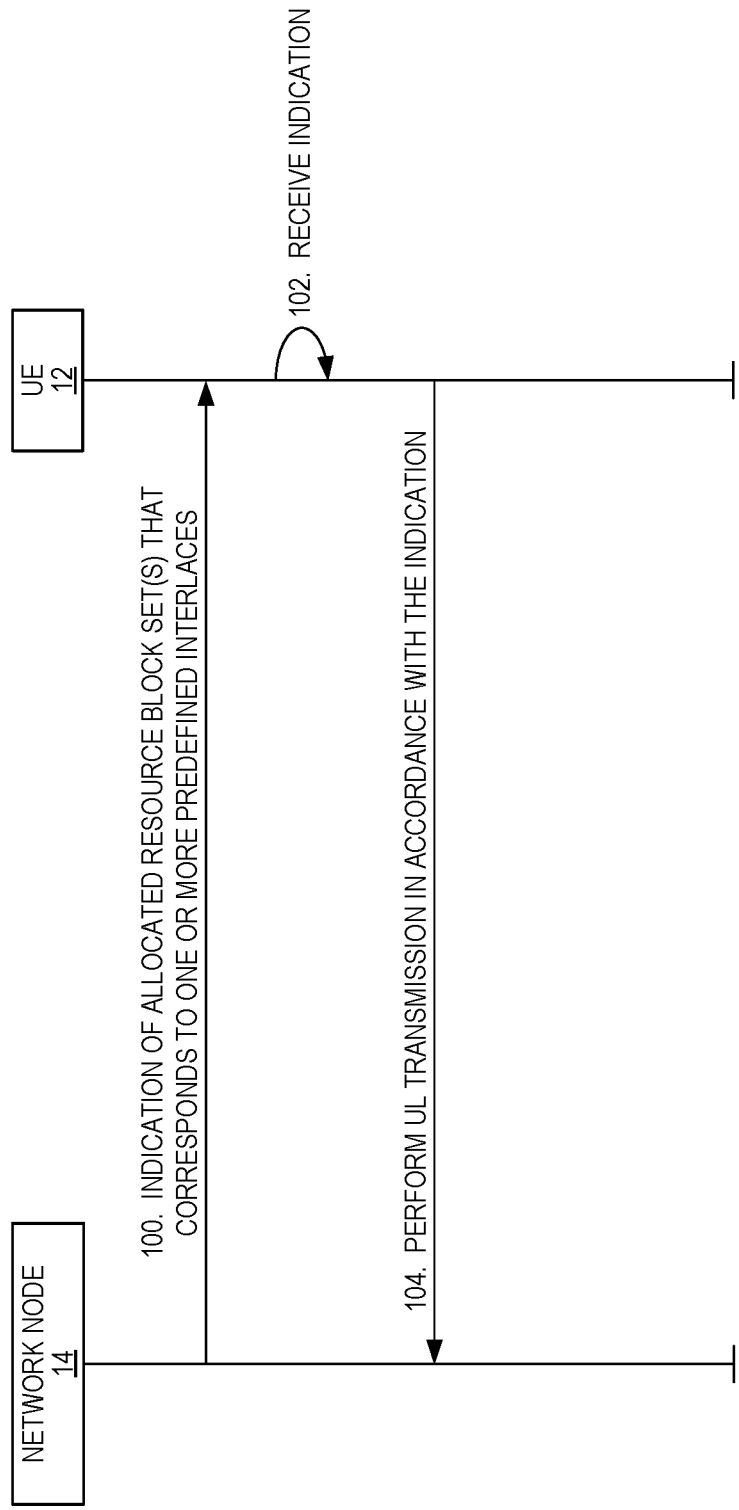
FIG. 10 illustrates the operation of a radio access node and a wireless device according to some embodiments of the present disclosure.

FIG. 10 illustrates the operation of a network node 14 and a UE 12 according to some aspects of the first embodiment. As illustrated, the network node 14 signals, to the UE 12, an indication of a resource allocation for a UL grant for the UE 12 (step 100). As discussed above, the resource allocation is an allocation of one or more interlaces, where each interlace includes a respective set of RBs that are spread out across the entire bandwidth (i.e., the system bandwidth) of the UL carrier. As discussed above, the indication may be a bit pattern for a number of bits (e.g., six bits), where different possible bit patterns are mapped to different resource allocations. For example, if there are ten interlaces, different bit patterns may be mapped to different combinations of the ten interlaces. The UE 12 receives the indication of the resource allocation (step 102) and performs UL transmission in accordance with the resource allocation for the corresponding UL grant (step 104). In other words, the UE 12 performs UL transmission on the UL carrier on the allocated resources as scheduled by the UL grant.

Embodiment 2—Resource Allocation to Accommodate Other Signals

Due to coexistence with other signals (e.g., PRACH or transmission on contiguous UL RBs from in-band Internet of Things (IoT) devices), some RBs may be unusable to the UE 12. In that case, one or more interlaces may lose a number of RBs. In one non-limiting example, consider a contiguous chunk of six RBs (as used by LTE PRACH) being present in (and puncturing) the system bandwidth. In this case, six of the interlaces will lose one RB each. Hence, the available bandwidth among the ten interlaces in total for 20 MHz operation is reduced, with six of the interlaces having nine RBs each, and four of the interlaces having ten RBs each.

In general, due to coexistence with other signals, the system may have $N^{(i)}$ interlaces with i RBs each. In the above example, $N^{(10)}=4$, $N^{(9)}=6$. In general, the number of RBs assigned to a UE 12 can be written as $$\sum_{i=1}^{10} in^{(i)}$$

where $0 \le n^{(i)} \le N^{(i)}$ is the number of interlaces assigned to the UE 12 with i RBs each. Note that the number of RBs assigned to a UE 12 is constrained to be a factor of 2, 3, or 5. The allowed number of RBs according to this rule is shown as shaded in Table 2. For the example of a six RB chunk puncturing the available bandwidth, if a UE 12 is to be assigned two interlaces, assigning one interlace with ten RBs and a second interlace with nine RBs ($n^{(10)}=1$, $n^{(9)}=1$) will result in 19 RBs, which cannot be written as a factor of 2, 3, or 5. Hence, the UE 12 should either be assigned two ten RB interlaces)($n^{(10)}=2$, $n^{(9)}=0$) with 20 RBs in total, or two nine RB interlaces ($n^{(10)}=0$, $n^{(9)}=2$) with 18 RBs in total. In this embodiment, the interlaces assigned to the UE 12 are selected such that the total number of RBs falls in the set of allowed numbers.

The second embodiment is similar to that illustrated in FIG. 10. However, in the second embodiment, the resource allocation signaled to the UE 12 is designed as discussed above.

TABLE 2

Allowed numbers of RBs that meet the constraint of being expressible as a product of the factors 2, 3, or 5.

| 1 | 2 | 3 | 4 | 5 | 6 | 7 | 8 | 9 | 10 |
|---|---|---|---|---|---|---|---|---|---|
| 11 | 12 | 13 | 14 | 15 | 16 | 17 | 18 | 19 | 20 |
| 21 | 22 | 23 | 24 | 25 | 26 | 27 | 28 | 29 | 30 |
| 31 | 32 | 33 | 34 | 35 | 36 | 37 | 38 | 39 | 40 |
| 41 | 42 | 43 | 44 | 45 | 46 | 47 | 48 | 49 | 50 |
| 51 | 52 | 53 | 54 | 55 | 56 | 57 | 58 | 59 | 60 |
| 61 | 62 | 63 | 64 | 65 | 66 | 67 | 68 | 69 | 70 |
| 71 | 72 | 73 | 74 | 75 | 76 | 77 | 78 | 79 | 80 |
| 81 | 82 | 83 | 84 | 85 | 86 | 87 | 88 | 89 | 90 |
| 91 | 92 | 93 | 94 | 95 | 96 | 97 | 98 | 99 | 100 |

Embodiment 3—Placement of Coexisting Signals

In one non-limiting example, consider two six RB chunks placed in the system bandwidth. A total of 12 RBs becomes unusable; however, the exact puncturing each interlace suffers depends on how these two chunks are placed. For example, it is possible to place the two chunks such that out of the ten interlaces, four of them are not punctured and have ten RBs each, and six of them lose two RBs each and are left with eight RBs each ($N^{(10)}=4$, $N^{(8)}=6$). Such puncturing may be preferred to minimize the number of punctured interlaces. In an aspect of this embodiment, it is possible to place the two chunks such that $N^{(10)}=0$, $N^{(9)}=8$, $N^{(8)}=2$. That is, the six RB chunks may be placed such that more than six interlaces are affected. Such puncturing may be more desirable if the effect of puncturing is preferred to be distributed as evenly as possible, i.e., it is preferred to have as many interlaces as possible with the same number of RBs.

The third embodiment is similar to that illustrated in FIG. 10. However, in the third embodiment, the resource allocation signaled to the UE 12 is punctured as discussed above.

Embodiment 4—Placement of Coexisting Signals

In this embodiment, a single sequence of interlace indices is signaled to the UE 12 via RRC signaling. As a non-limiting example of this embodiment, the sequence of interlace indices could be [0 5 2 7 4 9 1 6 3 8], with interlace 0 being defined as shown in the first row of FIG. 9 and subsequent interlaces being shifted versions of this interlace in frequency. The UE 12 is then signaled a starting index in the sequence above and the number of interlaces being allocated to the UE 12, and the UE 12 simply uses consecutive interlaces from the starting index for its UL transmissions. For example, if the allocation is 0 to 2, then the UE's transmission will be on interlace #0, #2, and #5. As another example, if the allocation is 4 to 8, then the UE's transmission will be on interlace #1, #3, #4, #6, #8, and #9. In the case of a multi-subframe UL grant, the full allocation may be signaled for the first UL transmission, while a frequency shift is indicated for one or more of the UL transmissions in subsequent subframes.

A key aspect of this embodiment is the ability to signal the interlace sequence given above via RRC signaling since this allows optimization of the scheduling to various deployments.

It is another feature of the embodiment that the interlace index sequence can be provided in the System Information Block (SIB) broadcast. This allows the UE 20 to transmit on the correct interlaces before being RRC connected or configured.

Another non-limiting example of the interlace index sequence is [0, 5, 1, 6, 2, 7, 3, 8, 4, 9].

Figure 11:
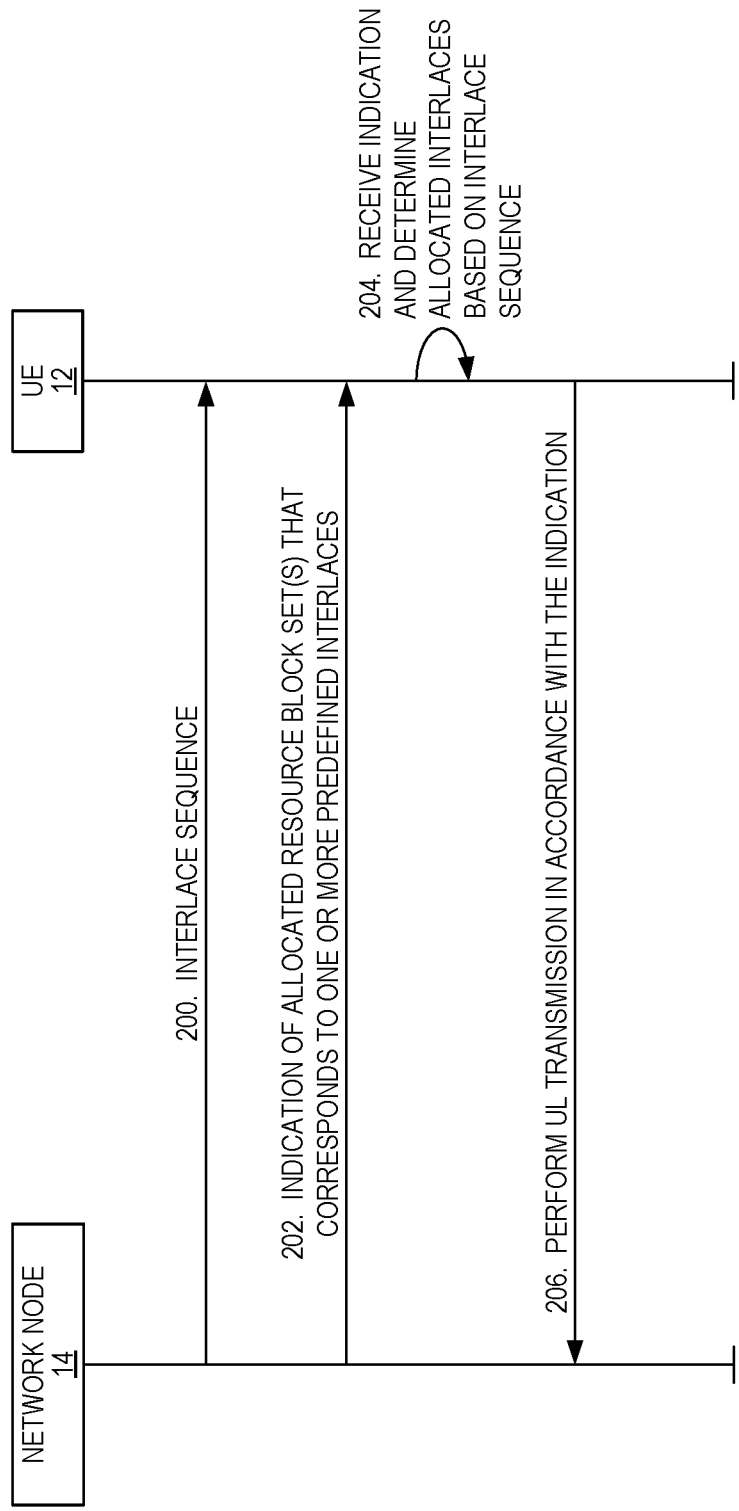
FIG. 11 illustrates the operation of a radio access node and a wireless device according to some other embodiments of the present disclosure.

FIG. 11 illustrates the operation of a network node 14 and a UE 12 according to some aspects of the fourth embodiment. As illustrated, the network node 14 signals, to the UE 12, a interlace sequence (step 200). The network node 14 also signals, to the UE 12, an indication of a resource allocation for a UL grant for the UE 12 (step 202). Here, the indication is, in some embodiments, an indication of the starting RB and the size of the resource allocation (i.e., the number of interlaces). The UE 12 receives the indication of the resource allocation and determines the allocated resources based on the received indication and the interlace sequence (step 204). The UE 12 performs UL transmission in accordance with the resource allocation for the corresponding UL grant (step 206). In other words, the UE 12 performs UL transmission on the UL carrier on the allocated resources as scheduled by the UL grant.

Figure 12:
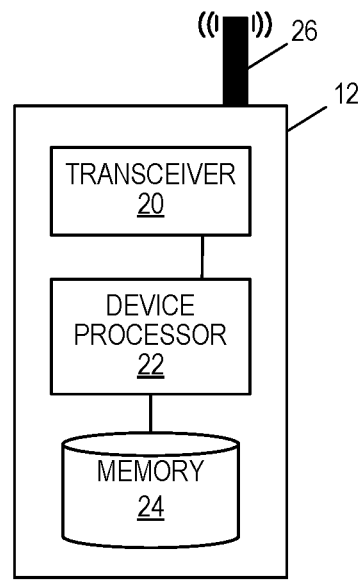
FIG. 12 is a block schematic of an exemplary wireless device in accordance with certain embodiments.

FIG. 12 is a block schematic of an exemplary wireless device 12, in accordance with certain embodiments. The wireless device 12 may refer to any type of wireless device communicating with a node and/or with another wireless device in a cellular or mobile communication system. Examples of wireless devices 12 include a mobile phone, a smart phone, a Personal Digital Assistant (PDA), a portable computer (e.g., laptop, tablet), a sensor, a modem, a MTC device/M2M device, LEE, LME, USB dongles, a D2D capable device, or another device that can provide wireless communication. A wireless device 12 may also be referred to as UE, a station, a device, or a terminal in some embodiments. The wireless device 12 includes a transceiver 20, a processor 22, and memory 24. In some embodiments, the transceiver 20 facilitates transmitting wireless signals to and receiving wireless signals from a network node 14 (e.g., via an antenna 26), the processor 22 executes instructions to provide some or all of the functionality described above as being provided by the wireless device 12, and the memory 24 stores the instructions executed by the processor 22.

The processor 22 may include any suitable combination of hardware and software implemented in one or more modules to execute instructions and manipulate data to perform some or all of the described functions of the wireless device 12, such as the functions of the wireless device 12 described above in relation to FIGS. 1 through 11. In some embodiments, the processor 22 may include, for example, one or more computers, one or more Central Processing Units (CPUs), one or more microprocessors, one or more applications, one or more Application Specific Integrated Circuits (ASICs), one or more Field Programmable Gate Arrays (FPGAs), and/or other logic.

The memory 24 is generally operable to store instructions, such as a computer program, software, an application including one or more of logic, rules, algorithms, code, tables, etc., and/or other instructions capable of being executed by a processor. Examples of the memory 24 include computer memory (for example, Random Access Memory (RAM) or Read Only Memory (ROM)), mass storage media (for example, a hard disk), removable storage media (for example, a compact disk or a digital video disk), and/or or any other volatile or non-volatile, non-transitory computer-readable, and/or computer-executable memory devices that store information, data, and/or instructions that may be used by the processor 22.

Other embodiments of the wireless device 12 may include additional components beyond those shown in FIG. 12 that may be responsible for providing certain aspects of the wireless device's functionality, including any of the functionality described above and/or any additional functionality (including any functionality necessary to support the solution described above). As just one example, the wireless device 12 may include input devices and circuits, output devices, and one or more synchronization units or circuits, which may be part of the processor 22. Input devices include mechanisms for entry of data into the wireless device 12. For example, input devices may include input mechanisms, such as a microphone, input elements, a display, etc. Output devices may include mechanisms for outputting data in audio, video, and/or hard copy format. For example, output devices may include a speaker, a display, etc.

Figure 13:
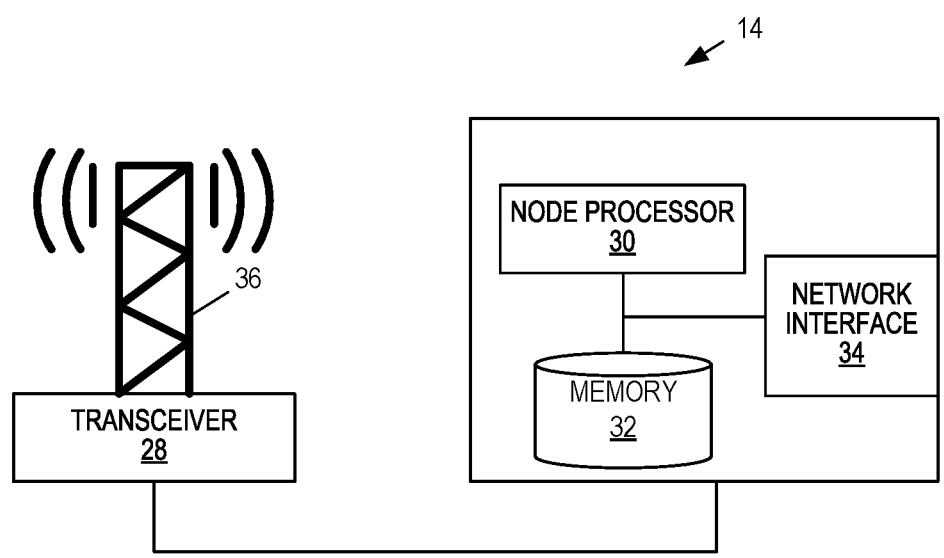
FIG. 13 is a block schematic of an exemplary network node in accordance with certain embodiments.

FIG. 13 is a block schematic of an exemplary network node 14, in accordance with certain embodiments. The network node 14 may be any type of radio network node or any network node that communicates with a UE 12 and/or with another network node. Examples of the network node 14 include an eNB, a Node B, a base station, a wireless AP (e.g., a Wi-Fi AP), a low power node, a BTS, a relay, a donor node controlling relay, transmission points, transmission nodes, a RRU, a RRH, a MSR radio node such as a MSR base station, nodes in a DAS, O&M, an OSS, a SON, a positioning node (e.g., an E-SMLC), MDT, or any other suitable network node. The network nodes 14 may be deployed throughout the wireless communications network 10 as a homogenous deployment, a heterogeneous deployment, or a mixed deployment. A homogeneous deployment may generally describe a deployment made up of the same (or similar) type of network nodes 14 and/or similar coverage and cell sizes and inter-site distances. A heterogeneous deployment may generally describe deployments using a variety of types of network nodes 14 having different cell sizes, transmit powers, capacities, and inter-site distances. For example, a heterogeneous deployment may include a plurality of low power nodes placed throughout a macro cell layout. Mixed deployments may include a mix of homogenous portions and heterogeneous portions.

The network node 14 may include one or more of a transceiver 28, a processor 30, memory 32, and a network interface 34. In some embodiments, the transceiver 28 facilitates transmitting wireless signals to and receiving wireless signals from a wireless device 12 (e.g., via an antenna 36), the processor 30 executes instructions to provide some or all of the functionality described above as being provided by a network node 14, the memory 32 stores the instructions executed by the processor 30, and the network interface 34 communicates signals to backend network components, such as a gateway, a switch, a router, the Internet, a PSTN, core network nodes or radio network controllers, etc.

The processor 30 may include any suitable combination of hardware and software implemented in one or more modules to execute instructions and manipulate data to perform some or all of the described functions of the network node 14, such as those described above in relation to FIGS. 1 through 11. In some embodiments, the processor 30 may include, for example, one or more computers, one or more CPUs, one or more microprocessors, one or more applications, and/or other logic.

The memory 32 is generally operable to store instructions, such as a computer program, software, an application including one or more of logic, rules, algorithms, code, tables, etc., and/or other instructions capable of being executed by a processor. Examples of the memory 32 include computer memory (for example, RAM or ROM), mass storage media (for example, a hard disk), removable storage media (for example, a compact disk or a digital video disk), and/or or any other volatile or non-volatile, non-transitory computer-readable, and/or computer-executable memory devices that store information.

In some embodiments, the network interface 34 is communicatively coupled to the processor 30 and may refer to any suitable device operable to receive input for the network node 14, send output from the network node 14, perform suitable processing of the input or output or both, communicate to other devices, or any combination of the preceding. The network interface 34 may include appropriate hardware (e.g., a port, a modem, a network interface card, etc.) and software, including protocol conversion and data processing capabilities, to communicate through a network.

Other embodiments of the network node 14 may include additional components beyond those shown in FIG. 13 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different RATs, or may represent partly or entirely different physical components.

Figure 14:
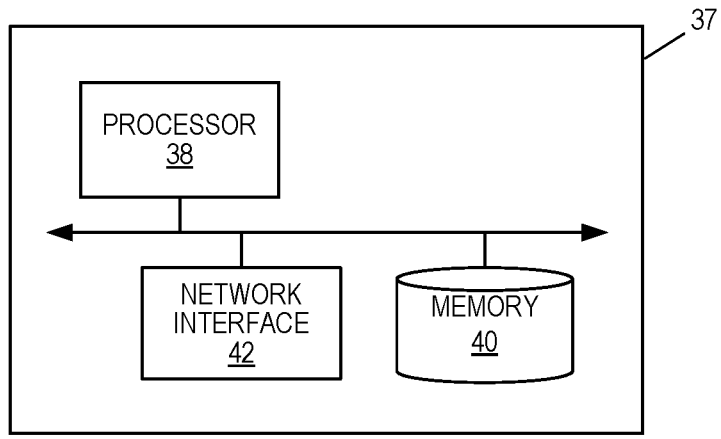
FIG. 14 is a block schematic of an exemplary radio network controller or core network node in accordance with certain embodiments.

FIG. 14 is a block schematic of an exemplary radio network controller or core network node 37, in accordance with certain embodiments. Examples of network nodes can include a MSC, a Serving General Packet Radio Service (GPRS) Support Node (SGSN), a MME, a RNC, a BSC, and so on. The radio network controller or core network node 37 includes a processor 38, memory 40, and a network interface 42. In some embodiments, the processor 38 executes instructions to provide some or all of the functionality described above as being provided by the network node, the memory 40 stores the instructions executed by the processor 38, and the network interface 42 communicates signals to any suitable node, such as a gateway, a switch, a router, the Internet, a PSTN, network nodes 14, radio network controllers or core network nodes 37, etc.

The processor 38 may include any suitable combination of hardware and software implemented in one or more modules to execute instructions and manipulate data to perform some or all of the described functions of the radio network controller or core network node 37. In some embodiments, the processor 38 may include, for example, one or more computers, one or more CPUs, one or more microprocessors, one or more applications, and/or other logic.

The memory 40 is generally operable to store instructions, such as a computer program, software, an application including one or more of logic, rules, algorithms, code, tables, etc., and/or other instructions capable of being executed by a processor. Examples of the memory 40 include computer memory (for example, RAM or ROM), mass storage media (for example, a hard disk), removable storage media (for example, a compact disk or a digital video disk), and/or or any other volatile or non-volatile, non-transitory computer-readable, and/or computer-executable memory devices that store information.

In some embodiments, the network interface 42 is communicatively coupled to the processor 38 and may refer to any suitable device operable to receive input for the network node, send output from the network node, perform suitable processing of the input or output or both, communicate to other devices, or any combination of the preceding. The network interface 42 may include appropriate hardware (e.g., a port, a modem, a network interface card, etc.) and software, including protocol conversion and data processing capabilities, to communicate through a network.

Other embodiments of the network node may include additional components beyond those shown in FIG. 14 that may be responsible for providing certain aspects of the network node's functionality, including any of the functionality described above and/or any additional functionality (including any functionality necessary to support the solution described above).

Figure 15:
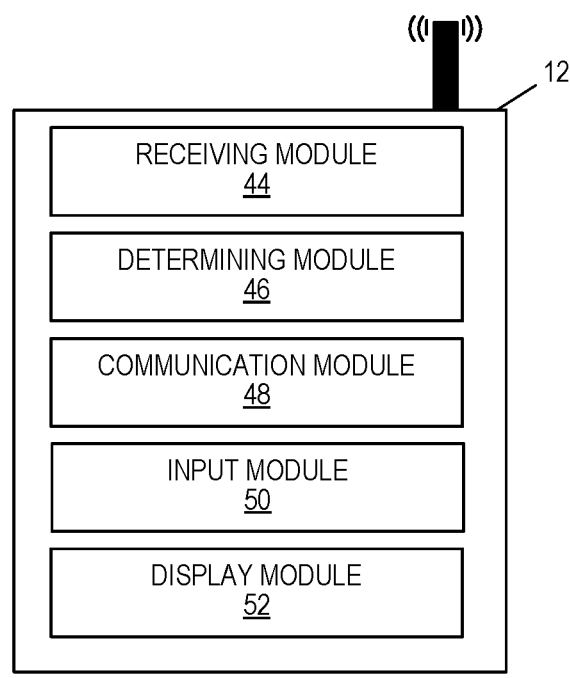
FIG. 15 is a block schematic of an exemplary wireless device in accordance with certain embodiments.

FIG. 15 is a block schematic of an exemplary wireless device 12, in accordance with certain embodiments. The wireless device 12 may include one or more modules. For example, the wireless device 12 may include a receiving module 44 operable to receive an indication of a resource allocation as described above, a determining module 46 for determining the resource allocation based on the received indication, and a communication module 48 operable to perform UL transmission in accordance with a received UL grant on the resources corresponding to the indicated resource allocation. The wireless device 12 may include additional modules such as, e.g., an input module 50, a display module 52, and any other suitable modules. The wireless device 12 may perform the resource allocation and signaling methods for scheduling in unlicensed spectrum described above with respect to FIGS. 1 through 11.

The determining module 46 may perform the processing functions of the wireless device 12. The determining module 46 may include or be included in one or more processors, such as the processor 22 described above in relation to FIG. 12. The determining module 46 may include analog and/or digital circuitry configured to perform any of the functions of the determining module 46 and/or the processor 22 described above. The functions of the determining module 46 described above may, in certain embodiments, be performed in one or more distinct modules.

The communication module 48 may perform the transmission functions of the wireless device 12. For example, the communication module 48 may perform a transmission in unlicensed spectrum according to a received resource allocation. The communication module 48 may transmit messages to one or more of network nodes 14 of the wireless communications network 10. The communication module 48 may include a transmitter and/or a transceiver, such as the transceiver 20 described above in relation to FIG. 12. The communication module 48 may include circuitry configured to wirelessly transmit messages and/or signals. In particular embodiments, the communication module 48 may receive messages and/or signals for transmission from the determining module 46. In certain embodiments, the functions of the communication module 48 described above may be performed in one or more distinct modules.

The receiving module 44 may perform the receiving functions of the wireless device 12. As one example, the receiving module 44 may receive a resource allocation for a transmission in unlicensed spectrum, the resource allocation designed based on one or more criteria. As another example, the receiving module 44 may receive a structure of the resource allocation. The receiving module 44 may include a receiver and/or a transceiver, such as the transceiver 20 described above in relation to FIG. 12. The receiving module 44 may include circuitry configured to wirelessly receive messages and/or signals. In particular embodiments, the receiving module 44 may communicate received messages and/or signals to the determining module 46.

The input module 50 may receive user input intended for the wireless device 12. For example, the input module 50 may receive key presses, button presses, touches, swipes, audio signals, video signals, and/or any other appropriate signals. The input module 50 may include one or more keys, buttons, levers, switches, touchscreens, microphones, and/or cameras. The input module 50 may communicate received signals to the determining module 46.

The display module 52 may present signals on a display of the wireless device 12. The display module 52 may include the display and/or any appropriate circuitry and hardware configured to present signals on the display. The display module 52 may receive signals to present on the display from the determining module 46.

The determining module 46, the receiving module 44, the communication module 48, the input module 50, and the display module 52 may include any suitable configuration of hardware and/or software. The wireless device 12 may include additional modules beyond those shown in FIG. 15 that may be responsible for providing any suitable functionality, including any of the functionality described above and/or any additional functionality (including any functionality necessary to support the various solutions described herein).

Figure 16:
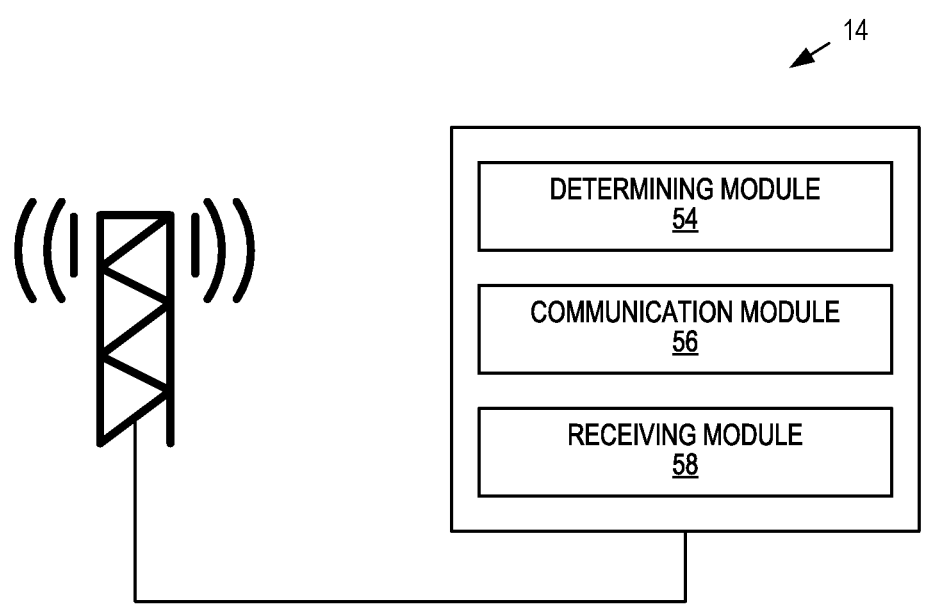
FIG. 16 is a block schematic of an exemplary network node in accordance with certain embodiments.

FIG. 16 is a block schematic of an exemplary network node 14, in accordance with certain embodiments. The network node 14 may include one or more modules. For example, the network node 14 may include a determining module 54, a communication module 56, a receiving module 58, and any other suitable modules. In some embodiments, one or more of the determining module 54, the communication module 56, the receiving module 58, or any other suitable module may be implemented using one or more processors, such as the processor 30 described above in relation to FIG. 13. In certain embodiments, the functions of two or more of the various modules may be combined into a single module. The network node 14 may perform the resource allocation and signaling methods for scheduling in unlicensed spectrum described above with respect to FIGS. 1 through 11.

The determining module 54 may perform the processing functions of the network node 14. As one example, the determining module 54 may design a resource allocation for a transmission in unlicensed spectrum based on one or more criteria. The determining module 54 may include or be included in one or more processors, such as the processor 30 described above in relation to FIG. 13. The determining module 54 may include analog and/or digital circuitry configured to perform any of the functions of the determining module 54 and/or the processor 30 described above. The functions of the determining module 54 may, in certain embodiments, be performed in one or more distinct modules. For example, in certain embodiments some of the functionality of the determining module 54 may be performed by an allocation module.

The communication module 56 may perform the transmission functions of the network node 14. As one example, the communication module 56 may signal the designed resource allocation to a UE 12. As another example, the communication module 56 may signal a structure of the designed resource allocation to the UE 12. The communication module 56 may transmit messages to one or more of the wireless devices 12. The communication module 56 may include a transmitter and/or a transceiver, such as the transceiver 28 described above in relation to FIG. 13. The communication module 56 may include circuitry configured to wirelessly transmit messages and/or signals. In particular embodiments, the communication module 56 may receive messages and/or signals for transmission from the determining module 54 or any other module.

The receiving module 58 may perform the receiving functions of the network node 14. The receiving module 58 may receive any suitable information from a wireless device 12. The receiving module 58 may include a receiver and/or a transceiver, such as the transceiver 28 described above in relation to FIG. 13. The receiving module 58 may include circuitry configured to wirelessly receive messages and/or signals. In particular embodiments, the receiving module 58 may communicate received messages and/or signals to the determining module 54 or any other suitable module.

The determining module 54, the communication module 56, and the receiving module 58 may include any suitable configuration of hardware and/or software. The network node 14 may include additional modules beyond those shown in FIG. 16 that may be responsible for providing any suitable functionality, including any of the functionality described above and/or any additional functionality (including any functionality necessary to support the various solutions described herein).

The present disclosure contemplates various embodiments that may enable the management of UL transmissions in unlicensed spectrum by providing the ability to vary the gaps between transmissions by different nodes. Signaling to enable this functionality is disclosed.

According to one example embodiment, a method in a node is disclosed. The method comprises designing a resource allocation for a transmission in unlicensed spectrum based on one or more criteria. The method comprises signaling the designed resource allocation to a UE. Optionally, in certain embodiments one or more of the following may apply:

the one or more criteria may comprise one or more of: an allowed transmit power; bandwidth occupancy requirements; channel estimation performance; number of RBs being a product of the factors 2, 3, or 5; pruning due to presence of other signals such as PRACH; and reduction of number of signaled bits; and the method may comprise signaling a structure of the designed resource allocation to the UE.

According to another example embodiment, a method in a UE is disclosed. The method comprises receiving a resource allocation for a transmission in unlicensed spectrum, the resource allocation designed based on one or more criteria. The method comprises performing a transmission in unlicensed spectrum according to the received resource allocation. Optionally, in certain embodiments one or more of the following may apply:

the one or more criteria may comprise one or more of: an allowed transmit power; bandwidth occupancy requirements; channel estimation performance; number of RBs being a product of the factors 2, 3, or 5; pruning due to presence of other signals such as PRACH; and reduction of number of signaled bits; and the method may comprise receiving a structure of the resource allocation.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations, and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The following acronyms are used throughout this disclosure.

- µs Microsecond
- 3GPP Third Generation Partnership Project
- 5G Fifth Generation
- ACK Acknowledgement
- AP Access Point
- ASIC Application Specific Integrated Circuit
- BSC Base Station Controller
- BTS Base Transceiver Station
- CA Carrier Aggregation
- CC Component Carrier
- CCA Clear Channel Assessment
- CDMA2000 Code Division Multiple Access 2000
- CFI Control Format Indicator
- CIF Carrier Indicator Field
- CPE Customer Premises Equipment
- CPU Central Processing Unit
- CRS Cell Specific Reference Signal
- CSMA/CA Carrier Sense Multiple Access with Collision Avoidance
- CW Contention Window
- D2D Device-to-Device
- DAS Distributed Antenna System
- dBm Decibel-Milliwatt
- DCI Downlink Control Information
- DCF Distributed Coordination Function
- DIFS Distributed Coordination Function Inter-Frame Spacing
- DFT Discrete Fourier Transform
- DIFS Distributed Inter-Frame Space
- DL Downlink
- eNB Enhanced or Evolved Node B
- EPDCCH Enhanced Physical Downlink Control Channel
- E-SMLC Evolved Serving Mobile Location Center
- FDMA Frequency Division Multiple Access
- FPGA Field Programmable Gate Array
- GHz Gigahertz
- GPRS General Packet Radio Service
- GSM Global System for Mobile Communications
- HARQ Hybrid Automatic Repeat Request
- HSPA High Speed Packet Access
- IoT Internet of Things
- LAA License Assisted Access
- LBT Listen-Before-Talk
- LAN Local Area Network
- LEE Laptop Embedded Equipment
- LME Laptop Mounted Equipment
- LTE Long Term Evolution
- LTE-U Long Term Evolution Unlicensed
- M2M Machine-to-Machine
- MAN Metropolitan Area Network
- MCE Multi-cell/Multicast Coordination Entity
- MDT Minimization of Drive Tests
- MHz Megahertz
- MME Mobility Management Entity
- ms Millisecond
- MSC Mobile Switching Center
- MSR Multi-Standard Radio
- MTC Machine Type Communication
- NDI New Data Indicator
- O&M Operation and Management
- OFDM Orthogonal Frequency Division Multiplexing
- OSS Operations Support System
- PCell Primary Cell
- PCF Point Coordination Function
- PDA Personal Digital Assistant
- PDCCH Physical Downlink Control Channel
- PDSCH Physical Downlink Shared Channel
- PIFS PCF Inter-Frame Spacing
- PRACH Physical Random Access Channel
- PRB Physical Resource Block
- PSD Power Spectral Density
- PSTN Public Switched Telephone Network
- PUSCH Physical Uplink Shared Channel
- PUCCH Physical Uplink Control Channel
- RAM Random Access Memory
- RAT Radio Access Technology
- RB Resource Block
- Rel Release
- RNC Radio Network Controller
- ROM Read Only Memory
- RRC Radio Resource Control
- RRH Remote Radio Head
- RRU Remote Radio Unit
- RV Redundancy Version
- SCell Secondary Cell
- SC-FDMA Single Carrier Frequency Division Multiple Access
- SGSN Serving General Packet Radio Service Support Node
- SIB System Information Block
- SON Self-Organizing Network
- UE User Equipment
- UL Uplink
- UMB Ultra Mobile Broadband
- UMTS Universal Mobile Telecommunications System
- USB Universal Serial Bus
- WAN Wide Area Network
- W-CDMA Wideband Code Division Multiple Access
- WLAN Wireless Local Area Network Those skilled in the art will recognize improvements and modifications to the embodiments of the present disclosure. All such improvements and modifications are considered within the scope of the concepts disclosed herein and the claims that follow.

What is claimed is:

1. A method of operation of a network node in a wireless communication network, comprising:

signaling, to a wireless device, an indication of one or more allocated sets of resource blocks that are allocated to the wireless device by an uplink grant for transmission on an uplink carrier in an unlicensed frequency spectrum, wherein the one or more allocated sets of resource blocks are a particular combination from among a plurality of combinations of one or more of a plurality of defined sets of resource blocks that correspond to a plurality of interlaces, respectively, that each spread out across an entire bandwidth of the uplink carrier as defined by a default table stored in the wireless device; and signaling, to the wireless device, via Radio Resource Control signaling, a new table to replace the default table, wherein the new table defines a plurality of new combinations of one or more of the plurality of defined sets of resource blocks that correspond to the plurality of interlaces, respectively, wherein the new table is to be used to interpret one or more subsequent indications of one or more allocated sets of resource blocks for one or more subsequent uplink grants.

2. The method of claim 1 wherein the entire bandwidth of the uplink carrier corresponds to 100 resource blocks having an order that corresponds to indices 0 through 99 starting at one edge of the entire bandwidth of the uplink carrier as defined by the default table, and the one or more allocated sets of resource blocks comprise:
- a first defined set of resource blocks for a first interlace consisting of resource blocks at locations corresponding to indices 0, 10, 20, 30, 40, 50, 60, 70, 80, and 90; and
- a second defined set of resource blocks for a second interlace consisting of resource blocks at locations corresponding to indices 5, 15, 25, 35, 45, 55, 65, 75, 85, and 95.

3. The method of claim 1 wherein the entire bandwidth of the uplink carrier corresponds to 100 resource blocks having an order that corresponds to indices 0 through 99 starting at one edge of the entire bandwidth of the uplink carrier as defined by the default table, and the one or more allocated sets of resource blocks comprise:
- a first defined set of resource blocks for a first interlace consisting of resource blocks at locations corresponding to indices 1, 11, 21, 31, 41, 51, 61, 71, 81, and 91; and
- a second defined set of resource blocks for a second interlace consisting of resource blocks at locations corresponding to indices 6, 16, 26, 36, 46, 56, 66, 76, 86, and 96.

4. The method of claim 1 wherein the entire bandwidth of the uplink carrier corresponds to 100 resource blocks having an order that corresponds to indices 0 through 99 starting at one edge of the entire bandwidth of the uplink carrier as defined by the default table, and the one or more allocated sets of resource blocks comprise:
- a first defined set of resource blocks for a first interlace consisting of resource blocks at locations corresponding to indices 2, 12, 22, 32, 42, 52, 62, 72, 82, and 92; and
- a second defined set of resource blocks for a second interlace consisting of resource blocks at locations corresponding to indices 7, 17, 27, 37, 47, 57, 67, 77, 87, and 97.

5. The method of claim 1 wherein the entire bandwidth of the uplink carrier corresponds to 100 resource blocks having an order that corresponds to indices 0 through 99 starting at one edge of the entire bandwidth of the uplink carrier as defined by the default table, and the one or more allocated sets of resource blocks comprise:
- a first defined set of resource blocks for a first interlace consisting of resource blocks at locations corresponding to indices 3, 13, 23, 33, 43, 53, 63, 73, 83, and 93; and
- a second defined set of resource blocks for a second interlace consisting of resource blocks at locations corresponding to indices 8, 18, 28, 38, 48, 58, 68, 78, 88, and 98.

6. The method of claim 1 wherein the entire bandwidth of the uplink carrier corresponds to 100 resource blocks having an order that corresponds to indices 0 through 99 starting at one edge of the entire bandwidth of the uplink carrier as defined by the default table, and the one or more allocated sets of resource blocks comprise:
- a first defined set of resource blocks for a first interlace consisting of resource blocks at locations corresponding to indices 4, 14, 24, 34, 44, 54, 64, 74, 84, and 94; and
- a second defined set of resource blocks for a second interlace consisting of resource blocks at locations corresponding to indices 9, 19, 29, 39, 49, 59, 69, 79, 89, and 99.

7. The method of claim 1 wherein the entire bandwidth of the uplink carrier corresponds to 100 resource blocks having an order that corresponds to indices 0 through 99 starting at one edge of the entire bandwidth of the uplink carrier as defined by the default table, and the one or more allocated sets of resource blocks comprise:
- a first defined set of resource blocks for a first interlace consisting of resource blocks at locations corresponding to indices 0, 10, 20, 30, 40, 50, 60, 70, 80, and 90;
- a second defined set of resource blocks for a second interlace consisting of resource blocks at locations corresponding to indices 1, 11, 21, 31, 41, 51, 61, 71, 81, and 91;
- a third defined set of resource blocks for a third interlace consisting of resource blocks at locations corresponding to indices 5, 15, 25, 35, 45, 55, 65, 75, 85, and 95; and
- a fourth defined set of resource blocks for a fourth interlace consisting of resource blocks at locations corresponding to indices 6, 16, 26, 36, 46, 56, 66, 76, 86, and 96.

8. The method of claim 1 wherein the entire bandwidth of the uplink carrier corresponds to 100 resource blocks having an order that corresponds to indices 0 through 99 starting at one edge of the entire bandwidth of the uplink carrier as defined by the default table, and the one or more allocated sets of resource blocks comprise:
- a first defined set of resource blocks for a first interlace consisting of resource blocks at locations corresponding to indices 1, 11, 21, 31, 41, 51, 61, 71, 81, and 91;
- a second defined set of resource blocks for a second interlace consisting of resource blocks at locations corresponding to indices 2, 12, 22, 32, 42, 52, 62, 72, 82, and 92;
- a third defined set of resource blocks for a third interlace consisting of resource blocks at locations corresponding to indices 3, 13, 23, 33, 43, 53, 63, 73, 83, and 93;
- a fourth defined set of resource blocks for a fourth interlace consisting of resource blocks at locations corresponding to indices 6, 16, 26, 36, 46, 56, 66, 76, 86, and 96;
- a fifth defined set of resource blocks for a fifth interlace consisting of resource blocks at locations corresponding to indices 7, 17, 27, 37, 47, 57, 67, 77, 87, and 97; and
- a sixth defined set of resource blocks for a sixth interlace consisting of resource blocks at locations corresponding to indices 8, 18, 28, 38, 48, 58, 68, 78, 88, and 98.

9. The method of claim 1 wherein the entire bandwidth of the uplink carrier corresponds to 100 resource blocks having an order that corresponds to indices 0 through 99 starting at one edge of the entire bandwidth of the uplink carrier as defined by the default table, and the one or more allocated sets of resource blocks comprise:
- a first defined set of resource blocks for a first interlace consisting of resource blocks at locations corresponding to indices 1, 11, 21, 31, 41, 51, 61, 71, 81, and 91;

a second defined set of resource blocks for a second interlace consisting of resource blocks at locations corresponding to indices 2, 12, 22, 32, 42, 52, 62, 72, 82, and 92;

a third defined set of resource blocks for a third interlace consisting of resource blocks at locations corresponding to indices 3, 13, 23, 33, 43, 53, 63, 73, 83, and 93;

a fourth defined set of resource blocks for a fourth interlace consisting of resource blocks at locations corresponding to indices 4, 14, 24, 34, 44, 54, 64, 74, 84, and 94;

a fifth defined set of resource blocks for a fifth interlace consisting of resource blocks at locations corresponding to indices 6, 16, 26, 36, 46, 56, 66, 76, 86, and 96;

a sixth defined set of resource blocks for a sixth interlace consisting of resource blocks at locations corresponding to indices 7, 17, 27, 37, 47, 57, 67, 77, 87, and 97;

a seventh defined set of resource blocks for a seventh interlace consisting of resource blocks at locations corresponding to indices 8, 18, 28, 38, 48, 58, 68, 78, 88, and 98; and an eighth defined set of resource blocks for an eighth interlace consisting of resource blocks at locations corresponding to indices 9, 19, 29, 39, 49, 59, 69, 79, 89, and 99.

10. The method of claim 1 wherein the indication is one of a plurality of defined possible values for the indication, wherein the plurality of defined possible values comprise a plurality of different values that indicate different combinations of one or more sets of the plurality of defined sets of resource blocks for the plurality of interlaces, respectively as defined by the default table.

11. The method of claim 1 wherein the entire bandwidth of the uplink carrier corresponds to 100 resource blocks having an order that corresponds to indices 0 through 99 starting at one edge of the entire bandwidth of the uplink carrier as defined by the default table, and the plurality of defined sets of resource blocks comprise:

a first defined set of resource blocks for a first interlace consisting of resource blocks at locations corresponding to indices 0, 10, 20, 30, 40, 50, 60, 70, 80, and 90;

a second defined set of resource blocks for a second interlace consisting of resource blocks at locations corresponding to indices 1, 11, 21, 31, 41, 51, 61, 71, 81, and 91;

a third defined set of resource blocks for a third interlace consisting of resource blocks at locations corresponding to indices 2, 12, 22, 32, 42, 52, 62, 72, 82, and 92;

a fourth defined set of resource blocks for a fourth interlace consisting of resource blocks at locations corresponding to indices 3, 13, 23, 33, 43, 53, 63, 73, 83, and 93;

a fifth defined set of resource blocks for a fifth interlace consisting of resource blocks at locations corresponding to indices 4, 14, 24, 34, 44, 54, 64, 74, 84, and 94;

a sixth defined set of resource blocks for a sixth interlace consisting of resource blocks at locations corresponding to indices 5, 15, 25, 35, 45, 55, 65, 75, 85, and 95;

a seventh defined set of resource blocks for a seventh interlace consisting of resource blocks at locations corresponding to indices 6, 16, 26, 36, 46, 56, 66, 76, 86, and 96;

an eighth defined set of resource blocks for an eighth interlace consisting of resource blocks at locations corresponding to indices 7, 17, 27, 37, 47, 57, 67, 77, 87, and 97;

a ninth defined set of resource blocks for a ninth interlace consisting of resource blocks at locations corresponding to indices 8, 18, 28, 38, 48, 58, 68, 78, 88, and 98; and a tenth defined set of resource blocks for a tenth interlace consisting of resource blocks at locations corresponding to indices 9, 19, 29, 39, 49, 59, 69, 79, 89, and 99.

12. The method of claim 11 wherein the indication is one of a plurality of defined values, wherein the plurality of defined values comprises:

a first value that indicates that the one or more allocated sets of resource blocks comprise the first defined set of resource blocks for the first interlace and the sixth defined set of resource blocks for the sixth interlace;

a second value that indicates that the one or more allocated sets of resource blocks comprise the second defined set of resource blocks for the second interlace and the seventh defined set of resource blocks for the seventh interlace;

a third value that indicates that the one or more allocated sets of resource blocks comprise the third defined set of resource blocks for the third interlace and the eighth defined set of resource blocks for the eighth interlace;

a fourth value that indicates that the one or more allocated sets of resource blocks comprise the fourth defined set of resource blocks for the fourth interlace and the ninth defined set of resource blocks for the ninth interlace;

a fifth value that indicates that the one or more allocated sets of resource blocks comprise the fifth defined set of resource blocks for the fifth interlace and the tenth defined set of resource blocks for the tenth interlace;

a sixth value that indicates that the one or more allocated sets of resource blocks comprise the first defined set of resource blocks for the first interlace, the second defined set of resource blocks for the second interlace, the sixth defined set of resource blocks for the sixth interlace, and the seventh defined set of resource blocks for the seventh interlace;

a seventh value that indicates that the one or more allocated sets of resource blocks comprise the second defined set of resource blocks for the second interlace, the third defined set of resource blocks for the third interlace, the fourth defined set of resource blocks for the fourth interlace, the seventh defined set of resource blocks for the seventh interlace, the eighth defined set of resource blocks for the eighth interlace, and the ninth defined set of resource blocks for the ninth interlace; and an eighth value that indicates that the one or more allocated sets of resource blocks comprise the second defined set of resource blocks for the second interlace, the third defined set of resource blocks for the third interlace, the fourth defined set of resource blocks for the fourth interlace, the fifth defined set of resource blocks for the fifth interlace, the seventh defined set of resource blocks for the seventh interlace, the eighth defined set of resource blocks for the eighth interlace, the ninth defined set of resource blocks for the ninth interlace, and the tenth defined set of resource blocks for the tenth interlace.

13. The method of claim 1 wherein the indication is comprised in the uplink grant.

14. A network node for a wireless communication network, comprising: a processor; and memory storing instructions executable by the processor whereby the network node is configured to: signal, to a wireless device, an indication of one or more allocated sets of resource blocks that are allocated to the wireless device by an uplink grant for transmission on an uplink carrier in an unlicensed frequency spectrum wherein the one or more allocated sets of resource blocks are a particular combination from among a plurality of combinations of one or more of a plurality of defined sets of resource blocks that correspond to a plurality of interlaces, respectively, that each spread out across an entire bandwidth of the uplink carrier as defined by a default table stored in the wireless device; and signal, to the wireless device, via Radio Resource Control signaling, a new table to replace the default table, wherein the new table defines a plurality of new combinations of one or more of the plurality of defined sets of resource blocks that correspond to the plurality of interlaces, respectively, wherein the new table is to be used to interpret one or more subsequent indications of one or more allocated sets of resource blocks for one or more subsequent uplink grants.

15. A method of operation of a wireless device in a wireless communication network, comprising:
    receiving, from a network node, an indication of one or more allocated sets of resource blocks that are allocated to the wireless device by an uplink grant for transmission on an uplink carrier in an unlicensed frequency spectrum, wherein the one or more allocated sets of resource blocks are a particular combination from among a plurality of combinations of one or more of a plurality of defined sets of resource blocks that correspond to a plurality of interlaces, respectively, that each spread out across an entire bandwidth of the uplink carrier as defined by a default table stored in the wireless device;
    receiving, from the network node, via Radio Resource Control signaling, a new table to replace the default table at the wireless device wherein the new table defines a plurality of new combinations of one or more of the plurality of defined sets of resource blocks that correspond to the plurality of interlaces, respectively, wherein the new table is to be used to interpret one or more subsequent indications of one or more allocated sets of resource blocks for one or more subsequent uplink grants; and
    performing uplink transmission on the uplink carrier in accordance with the indication of the one or more allocated sets of resource blocks.

16. The method of claim 15 wherein the entire bandwidth of the uplink carrier corresponds to 100 resource blocks having an order that corresponds to indices 0 through 99 starting at one edge of the entire bandwidth of the uplink carrier as defined by the default table, and the one or more allocated sets of resource blocks comprise:
    a first defined set of resource blocks for a first interlace consisting of resource blocks at locations corresponding to indices 0, 10, 20, 30, 40, 50, 60, 70, 80, and 90; and
    a second defined set of resource blocks for a second interlace consisting of resource blocks at locations corresponding to indices 5, 15, 25, 35, 45, 55, 65, 75, 85, and 95.

17. The method of claim 15 wherein the entire bandwidth of the uplink carrier corresponds to 100 resource blocks having an order that corresponds to indices 0 through 99 starting at one edge of the entire bandwidth of the uplink carrier as defined by the default table, and the one or more allocated sets of resource blocks comprise:
    a first defined set of resource blocks for a first interlace consisting of resource blocks at locations corresponding to indices 1, 11, 21, 31, 41, 51, 61, 71, 81, and 91; and
    a second defined set of resource blocks for a second interlace consisting of resource blocks at locations corresponding to indices 6, 16, 26, 36, 46, 56, 66, 76, 86, and 96.

18. The method of claim 15 wherein the entire bandwidth of the uplink carrier corresponds to 100 resource blocks having an order that corresponds to indices 0 through 99 starting at one edge of the entire bandwidth of the uplink carrier as defined by the default table, and the one or more allocated sets of resource blocks comprise:
    a first defined set of resource blocks for a first interlace consisting of resource blocks at locations corresponding to indices 2, 12, 22, 32, 42, 52, 62, 72, 82, and 92; and
    a second defined set of resource blocks for a second interlace consisting of resource blocks at locations corresponding to indices 7, 17, 27, 37, 47, 57, 67, 77, 87, and 97.

19. The method of claim 15 wherein the entire bandwidth of the uplink carrier corresponds to 100 resource blocks having an order that corresponds to indices 0 through 99 starting at one edge of the entire bandwidth of the uplink carrier as defined by the default table, and the one or more allocated sets of resource blocks comprise:
    a first defined set of resource blocks for a first interlace consisting of resource blocks at locations corresponding to indices 3, 13, 23, 33, 43, 53, 63, 73, 83, and 93; and
    a second defined set of resource blocks for a second interlace consisting of resource blocks at locations corresponding to indices 8, 18, 28, 38, 48, 58, 68, 78, 88, and 98.

20. The method of claim 15 wherein the entire bandwidth of the uplink carrier corresponds to 100 resource blocks having an order that corresponds to indices 0 through 99 starting at one edge of the entire bandwidth of the uplink carrier as defined by the default table, and the one or more allocated sets of resource blocks comprise:
    a first defined set of resource blocks for a first interlace consisting of resource blocks at locations corresponding to indices 4, 14, 24, 34, 44, 54, 64, 74, 84, and 94; and
    a second defined set of resource blocks for a second interlace consisting of resource blocks at locations corresponding to indices 9, 19, 29, 39, 49, 59, 69, 79, 89, and 99.

21. The method of claim 15 wherein the entire bandwidth of the uplink carrier corresponds to 100 resource blocks having an order that corresponds to indices 0 through 99 starting at one edge of the entire bandwidth of the uplink carrier as defined by the default table, and the one or more allocated sets of resource blocks comprise:
    a first defined set of resource blocks for a first interlace consisting of resource blocks at locations corresponding to indices 0, 10, 20, 30, 40, 50, 60, 70, 80, and 90;
    a second defined set of resource blocks for a second interlace consisting of resource blocks at locations corresponding to indices 1, 11, 21, 31, 41, 51, 61, 71, 81, and 91;
    a third defined set of resource blocks for a third interlace consisting of resource blocks at locations corresponding to indices 5, 15, 25, 35, 45, 55, 65, 75, 85, and 95; and a fourth defined set of resource blocks for a fourth interlace consisting of resource blocks at locations corresponding to indices 6, 16, 26, 36, 46, 56, 66, 76, 86, and 96.

22. The method of claim 15 wherein the entire bandwidth of the uplink carrier corresponds to 100 resource blocks having an order that corresponds to indices 0 through 99 starting at one edge of the entire bandwidth of the uplink carrier as defined by the default table, and the one or more allocated sets of resource blocks comprise:
- a first defined set of resource blocks for a first interlace consisting of resource blocks at locations corresponding to indices 1, 11, 21, 31, 41, 51, 61, 71, 81, and 91;
- a second defined set of resource blocks for a second interlace consisting of resource blocks at locations corresponding to indices 2, 12, 22, 32, 42, 52, 62, 72, 82, and 92;
- a third defined set of resource blocks for a third interlace consisting of resource blocks at locations corresponding to indices 3, 13, 23, 33, 43, 53, 63, 73, 83, and 93;
- a fourth defined set of resource blocks for a fourth interlace consisting of resource blocks at locations corresponding to indices 6, 16, 26, 36, 46, 56, 66, 76, 86, and 96;
- a fifth defined set of resource blocks for a fifth interlace consisting of resource blocks at locations corresponding to indices 7, 17, 27, 37, 47, 57, 67, 77, 87, and 97; and
- a sixth defined set of resource blocks for a sixth interlace consisting of resource blocks at locations corresponding to indices 8, 18, 28, 38, 48, 58, 68, 78, 88, and 98.

23. The method of claim 15 wherein the entire bandwidth of the uplink carrier corresponds to 100 resource blocks having an order that corresponds to indices 0 through 99 starting at one edge of the entire bandwidth of the uplink carrier as defined by the default table, and the one or more allocated sets of resource blocks comprise:
- a first defined set of resource blocks for a first interlace consisting of resource blocks at locations corresponding to indices 1, 11, 21, 31, 41, 51, 61, 71, 81, and 91;
- a second defined set of resource blocks for a second interlace consisting of resource blocks at locations corresponding to indices 2, 12, 22, 32, 42, 52, 62, 72, 82, and 92;
- a third defined set of resource blocks for a third interlace consisting of resource blocks at locations corresponding to indices 3, 13, 23, 33, 43, 53, 63, 73, 83, and 93;
- a fourth defined set of resource blocks for a fourth interlace consisting of resource blocks at locations corresponding to indices 4, 14, 24, 34, 44, 54, 64, 74, 84, and 94;
- a fifth defined set of resource blocks for a fifth interlace consisting of resource blocks at locations corresponding to indices 6, 16, 26, 36, 46, 56, 66, 76, 86, and 96;
- a sixth defined set of resource blocks for a sixth interlace consisting of resource blocks at locations corresponding to indices 7, 17, 27, 37, 47, 57, 67, 77, 87, and 97;
- a seventh defined set of resource blocks for a seventh interlace consisting of resource blocks at locations corresponding to indices 8, 18, 28, 38, 48, 58, 68, 78, 88, and 98; and
- an eighth defined set of resource blocks for an eighth interlace consisting of resource blocks at locations corresponding to indices 9, 19, 29, 39, 49, 59, 69, 79, 89, and 99.

24. The method of claim 15 wherein the indication is one of a plurality of defined possible values for the indication, wherein the plurality of defined possible values comprise a plurality of different values that indicate different combinations of one or more sets of the plurality of defined sets of resource blocks for the plurality of interlaces, respectively as defined by the default table.

25. The method of claim 15 wherein the entire bandwidth of the uplink carrier corresponds to 100 resource blocks having an order that corresponds to indices 0 through 99 starting at one edge of the entire bandwidth of the uplink carrier as defined by the default table, and the plurality of defined sets of resource blocks comprise:
- a first defined set of resource blocks for a first interlace consisting of resource blocks at locations corresponding to indices 0, 10, 20, 30, 40, 50, 60, 70, 80, and 90;
- a second defined set of resource blocks for a second interlace consisting of resource blocks at locations corresponding to indices 1, 11, 21, 31, 41, 51, 61, 71, 81, and 91;
- a third defined set of resource blocks for a third interlace consisting of resource blocks at locations corresponding to indices 2, 12, 22, 32, 42, 52, 62, 72, 82, and 92;
- a fourth defined set of resource blocks for a fourth interlace consisting of resource blocks at locations corresponding to indices 3, 13, 23, 33, 43, 53, 63, 73, 83, and 93;
- a fifth defined set of resource blocks for a fifth interlace consisting of resource blocks at locations corresponding to indices 4, 14, 24, 34, 44, 54, 64, 74, 84, and 94;
- a sixth defined set of resource blocks for a sixth interlace consisting of resource blocks at locations corresponding to indices 5, 15, 25, 35, 45, 55, 65, 75, 85, and 95;
- a seventh defined set of resource blocks for a seventh interlace consisting of resource blocks at locations corresponding to indices 6, 16, 26, 36, 46, 56, 66, 76, 86, and 96;
- an eighth defined set of resource blocks for an eighth interlace consisting of resource blocks at locations corresponding to indices 7, 17, 27, 37, 47, 57, 67, 77, 87, and 97;
- a ninth defined set of resource blocks for a ninth interlace consisting of resource blocks at locations corresponding to indices 8, 18, 28, 38, 48, 58, 68, 78, 88, and 98; and
- a tenth defined set of resource blocks for a tenth interlace consisting of resource blocks at locations corresponding to indices 9, 19, 29, 39, 49, 59, 69, 79, 89, and 99.

26. The method of claim 15 wherein the indication is one of a plurality of defined values, wherein the plurality of defined values comprises:
- a first value that indicates that the one or more allocated sets of resource blocks comprise the first defined set of resource blocks for the first interlace and the sixth defined set of resource blocks for the sixth interlace;
- a second value that indicates that the one or more allocated sets of resource blocks comprise the second defined set of resource blocks for the second interlace and the seventh defined set of resource blocks for the seventh interlace;
- a third value that indicates that the one or more allocated sets of resource blocks comprise the third defined set of resource blocks for the third interlace and the eighth defined set of resource blocks for the eighth interlace;
- a fourth value that indicates that the one or more allocated sets of resource blocks comprise the fourth defined set of resource blocks for the fourth interlace and the ninth defined set of resource blocks for the ninth interlace;

a fifth value that indicates that the one or more allocated sets of resource blocks comprise the fifth defined set of resource blocks for the fifth interlace and the tenth defined set of resource blocks for the tenth interlace;

a sixth value that indicates that the one or more allocated sets of resource blocks comprise the first defined set of resource blocks for the first interlace, the second defined set of resource blocks for the second interlace, the sixth defined set of resource blocks for the sixth interlace, and the seventh defined set of resource blocks for the seventh interlace;

a seventh value that indicates that the one or more allocated sets of resource blocks comprise the second defined set of resource blocks for the second interlace, the third defined set of resource blocks for the third interlace, the fourth defined set of resource blocks for the fourth interlace, the seventh defined set of resource blocks for the seventh interlace, the eighth defined set of resource blocks for the eighth interlace, and the ninth defined set of resource blocks for the ninth interlace; and an eighth value that indicates that the one or more allocated sets of resource blocks comprise the second defined set of resource blocks for the second interlace, the third defined set of resource blocks for the third interlace, the fourth defined set of resource blocks for the fourth interlace, the fifth defined set of resource blocks for the fifth interlace, the seventh defined set of resource blocks for the seventh interlace, the eighth defined set of resource blocks for the eighth interlace, the ninth defined set of resource blocks for the ninth interlace, and the tenth defined set of resource blocks for the tenth interlace.

27. The method of claim 15 wherein the indication is comprised in the uplink grant.

28. A wireless device for a wireless communication network, comprising: a processor; and memory storing instructions executable by the processor whereby the wireless device is configured to: receive, from a network node, an indication of one or more allocated sets of resource blocks that are allocated to the wireless device by an uplink grant for transmission on an uplink carrier in an unlicensed frequency spectrum, wherein the one or more allocated sets of resource blocks are a particular combination from among a plurality of combinations of one or more of a plurality of defined sets of resource blocks that correspond to a plurality of interlaces, respectively, that each spread out across an entire bandwidth of the uplink carrier as defined by a default table stored in the wireless device; receive, from the network node, via Radio Resource Control signaling, a new table to replace the default table at the wireless device, wherein the new table defines a plurality of new combinations of one or more of the plurality of defined sets of resource blocks that correspond to the plurality of interlaces, respectively, wherein the new table is to be used to interpret one or more subsequent indications of one or more allocated sets of resource blocks for one or more subsequent uplink grants; and perform uplink transmission on the uplink carrier in accordance with the indication of the one or more allocated sets of resource blocks.

* * * * *